(12) United States Patent
McConville et al.

(10) Patent No.: US 10,787,949 B2
(45) Date of Patent: Sep. 29, 2020

(54) SYSTEMS AND METHOD FOR AN EXHAUST PORT ARRANGEMENT OF A SPLIT EXHAUST SYSTEM

(71) Applicant: Ford Global Technologies, LLC, Dearborn, MI (US)

(72) Inventors: Gregory Patrick McConville, Ann Arbor, MI (US); John Cornell, Allenton, MI (US); Joseph Norman Ulrey, St. Joseph, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/237,475

(22) Filed: Dec. 31, 2018

(65) Prior Publication Data

US 2020/0208561 A1 Jul. 2, 2020

(51) Int. Cl.
*F01N 13/10* (2010.01)
*F01N 13/18* (2010.01)

(52) U.S. Cl.
CPC ....... *F01N 13/107* (2013.01); *F01N 13/1805* (2013.01)

(58) Field of Classification Search
CPC ....... F01N 13/10; F01N 13/107; F02M 26/05; F02M 26/20
See application file for complete search history.

(56) References Cited

U.S. PATENT DOCUMENTS

| 6,742,506 | B1 | 6/2004 | Grandin |
| 8,069,663 | B2 | 12/2011 | Ulrey et al. |
| 8,479,511 | B2 | 7/2013 | Pursifull et al. |
| 8,495,992 | B2 | 7/2013 | Roth |
| 8,511,084 | B2 | 8/2013 | Ulrey et al. |
| 8,539,770 | B2 | 9/2013 | Williams |
| 8,601,811 | B2 | 12/2013 | Pursifull et al. |
| 8,701,409 | B2 | 4/2014 | Pursifull et al. |
| 9,080,523 | B1 | 7/2015 | Ulrey et al. |
| 9,399,969 | B2 | 7/2016 | Boyer et al. |

(Continued)

FOREIGN PATENT DOCUMENTS

WO 2016128642 A1 8/2016

OTHER PUBLICATIONS

Ulrey, J. et al., "Blowdown Runner Wastegate for a Split Exhaust Engine System," U.S. Appl. No. 15/886,651, filed Feb. 1, 2018, 50 pages.

(Continued)

*Primary Examiner* — Jonathan R Matthias
(74) *Attorney, Agent, or Firm* — Geoffrey Brumbaugh; McCoy Russell LLP

(57) ABSTRACT

Systems and methods are provided for an engine system having a split exhaust system. In one example, a system may include an engine having a plurality of cylinders, each of the plurality of cylinders including first and second exhaust ports, the first and second exhaust ports arranged in a non-alternating pattern across the plurality of cylinders and along a cylinder head, a blowdown exhaust manifold coupled to the first exhaust ports and an exhaust passage, and a scavenge exhaust manifold coupled to the second exhaust ports and an intake passage of the engine. In this way, the first and second exhaust ports may be arranged to enhance turbocharger performance characteristics.

13 Claims, 9 Drawing Sheets

(56) References Cited

U.S. PATENT DOCUMENTS

| | | |
|---|---|---|
| 9,447,754 B1 | 9/2016 | Clarke et al. |
| 9,482,148 B2 | 11/2016 | Wade et al. |
| 10,012,159 B1 | 7/2018 | Ulrey et al. |
| 10,018,123 B1 | 7/2018 | Ulrey et al. |
| 10,024,255 B2 | 7/2018 | Ulrey et al. |
| 10,060,371 B2 | 8/2018 | Ulrey |
| 10,094,310 B2 | 10/2018 | Ulrey et al. |
| 10,132,235 B2 | 11/2018 | Ulrey et al. |
| 10,138,822 B2 | 11/2018 | Ulrey et al. |
| 10,145,315 B2 | 12/2018 | Ulrey et al. |
| 10,145,320 B1 | 12/2018 | Zeng et al. |
| 10,161,332 B2 | 12/2018 | Ulrey et al. |
| 10,190,507 B2 | 1/2019 | Ulrey et al. |
| 2013/0111899 A1* | 5/2013 | Straub ............... F02D 13/0246 60/602 |
| 2014/0190458 A1* | 7/2014 | Gingrich ............... F02B 47/08 123/568.2 |
| 2015/0198099 A1* | 7/2015 | Ulrey ............... F02D 13/0242 60/602 |
| 2015/0316005 A1 | 11/2015 | Madison et al. |
| 2018/0170353 A1 | 6/2018 | Ulrey et al. |
| 2018/0171845 A1 | 6/2018 | Veiga Pagliari et al. |
| 2018/0171868 A1 | 6/2018 | Leone et al. |
| 2018/0171897 A1 | 6/2018 | Boyer et al. |
| 2018/0171898 A1 | 6/2018 | Ulrey et al. |
| 2018/0171899 A1 | 6/2018 | Ulrey et al. |
| 2018/0171904 A1 | 6/2018 | Ulrey et al. |
| 2018/0171907 A1 | 6/2018 | Ulrey et al. |
| 2018/0171913 A1 | 6/2018 | Ulrey et al. |
| 2019/0040791 A1 | 2/2019 | Ulrey et al. |

OTHER PUBLICATIONS

Surnilla, G. et al., "Method For Determining a Dilution of Recirculated Gases in a Split Exhaust Engine," U.S. Appl. No. 15/926,940, filed Mar. 20, 2018, 72 pages.

Madison, D. et al., "Method For Determining a Dilution of Recirculated Gases in a Split Exhaust Engine," U.S. Appl. No. 15/926,970, filed Mar. 20, 2018, 75 pages.

* cited by examiner

SYSTEMS AND METHOD FOR AN EXHAUST PORT ARRANGEMENT OF A SPLIT EXHAUST SYSTEM

FIELD

The present description relates generally to systems and methods for an engine having a split exhaust system.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that a split exhaust system, where a first exhaust manifold routes exhaust to a turbine of the turbocharger in an exhaust of the engine and a second exhaust manifold routes exhaust gas recirculation (EGR) to an intake of the engine, upstream of a compressor of the turbocharger, may decrease engine knock and increase engine efficiency. In such an engine system, each cylinder may include two intake valves and two exhaust valves, where a first set of cylinder exhaust valves (e.g., blowdown exhaust valves) are exclusively coupled to the first exhaust manifold via a first set of exhaust ports, and a second set of cylinder exhaust valves (e.g., scavenge exhaust valves) are exclusively coupled to the second exhaust manifold via a second set of exhaust ports. The first set of cylinder exhaust valves may be operated at a different timing than the second set of cylinder exhaust valves, thereby isolating a blowdown portion and a scavenging portion of exhaust gases. The timing of the second set of cylinder exhaust valves may also be coordinated with a timing of the cylinder intake valves to create a positive valve overlap period where fresh intake air (or a mixture of fresh intake air and EGR), referred to as blow-through, may flow through the cylinders and back to the intake, upstream of the compressor, via an EGR passage coupled to the second exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while increasing a work efficiency of the turbine and increasing engine torque.

One example system is shown by Ulrey et al. in U.S. Pat. No. 10,024,255 B2. Therein, a split exhaust engine system is provided that delivers exhaust gas to an exhaust passage and a turbocharger turbine via a first exhaust ports and a first exhaust manifold and blowthrough air and exhaust gas recirculation to an intake passage via second exhaust ports and a second exhaust manifold. In particular, the system includes the first and second exhaust ports arranged in an alternating pattern across all of the engine cylinders, such that a location of the first exhaust port relative to the second exhaust port on each cylinder is the same on every cylinder.

The inventors herein have recognized that further increases in turbine performance can be achieved by altering the arrangement of the first and second exhaust ports. As one example, an amount of power available to drive the turbine increases as a pressure at an inlet of the turbine increases. The pressure at the turbine inlet is inversely related to a volume of the exhaust passages supplying exhaust gas to the turbine. Therefore, decreasing the volume of the exhaust passages increases the power available to drive the turbine. However, by including an exhaust port configuration that alternates the first and second exhaust ports across an inline engine, the volume of the exhaust passages may be greater than a minimum possible volume, thereby decreasing the amount of power available to drive the turbine. Furthermore, the alternating configuration results in volume differences (and therefore pressure differences) in the exhaust passages supplying exhaust gas from different cylinders or groups of cylinders, which may result in first order noise and vibration at the turbine.

In one example, the issues described above may be addressed by a system, comprising: an engine having a plurality of cylinders, each including first and second exhaust ports, the first and second exhaust ports arranged in a non-alternating pattern across the plurality of cylinders and along a cylinder head; a blowdown exhaust manifold coupled to the first exhaust port of each cylinder and an exhaust passage; and a scavenge exhaust manifold coupled to the second exhaust port of each cylinder and an intake passage. In this way, the first and second exhaust ports may be arranged to enhance turbocharger performance characteristics.

The system may further include a turbocharger turbine coupled in the exhaust passage, downstream of the blowdown exhaust manifold, with an inlet to the turbocharger turbine centered along a central axis of the cylinder head. As one example, the first exhaust port of each of the plurality of cylinders is arranged closer to the central axis than the second exhaust port of the corresponding cylinder. In such an example, a blowdown volume provided to the turbocharger turbine by each first exhaust port and the blowdown manifold may be decreased compared to when the first and second exhaust ports are alternated across the cylinder head, thereby increasing an amount of power available to drive the turbocharger turbine. As another example, the plurality of cylinders include two inner cylinders and two outer cylinders, and the first exhaust port of each of the two outer cylinders is arranged adjacent to the first exhaust port of one of the two inner cylinders. In such an example, a difference in the blowdown volume provided to the turbocharger turbine by the first exhaust ports of the two inner cylinders and the blowdown volume provided to the turbocharger turbine by the first exhaust ports of the two outer cylinders may be decreased compared to when the first and second exhaust ports are alternated across the cylinder head, thereby increasing turbine balance and decreasing first order noise and vibration at the turbine. Overall, by arranging the first and second exhaust ports in a non-alternating pattern across the cylinder head, an overall performance of the turbocharger included in the split exhaust system engine may be increased by further increasing the work efficiency of the turbine and/or the turbine balance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1B, 1C, 2B, and 2C are shown approximately to scale.

DETAILED DESCRIPTION

Figure 1A:
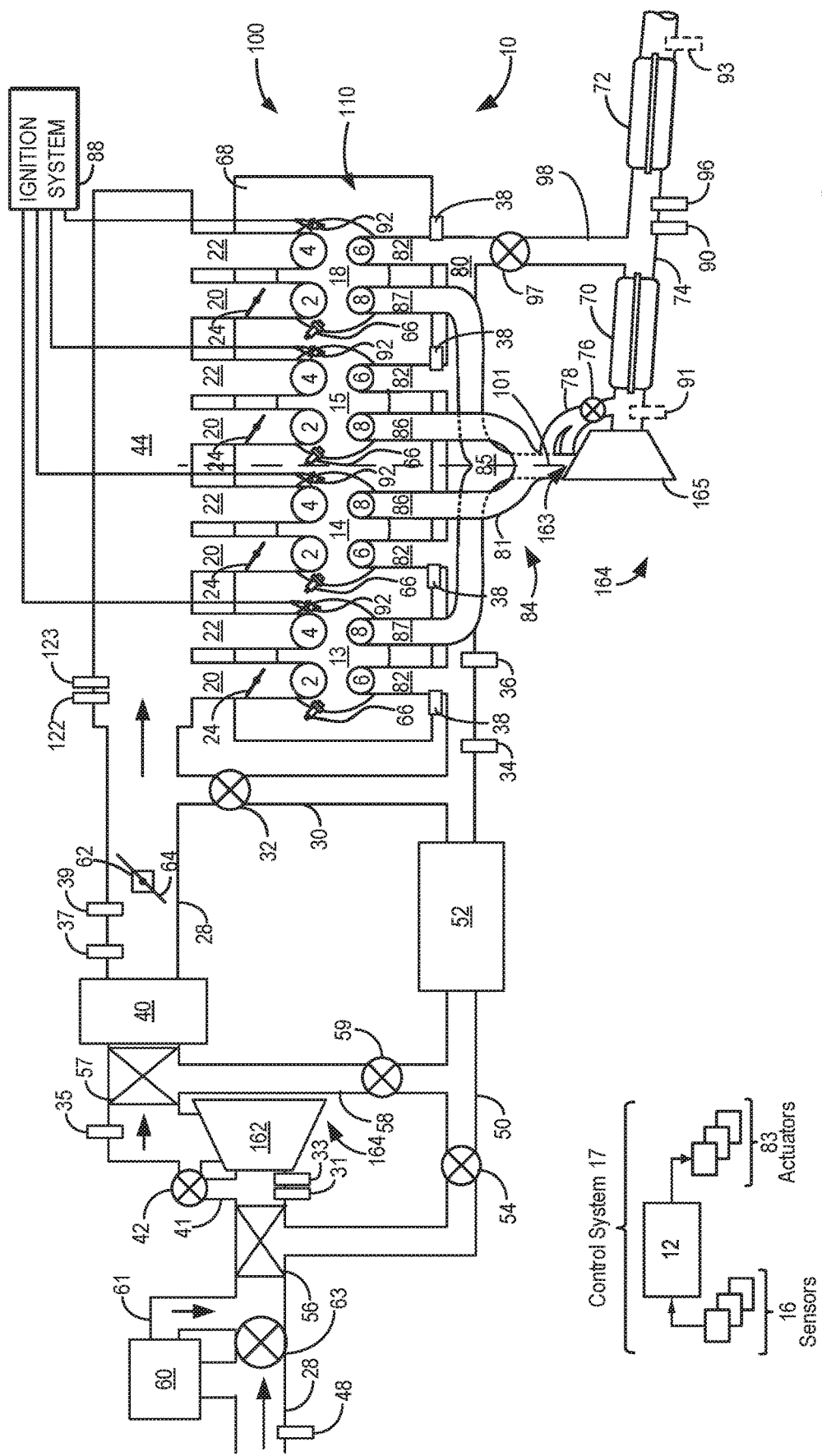
FIG. 1A shows a schematic depiction of a turbocharged engine system including a first example of a split exhaust system.
Figure 1B:
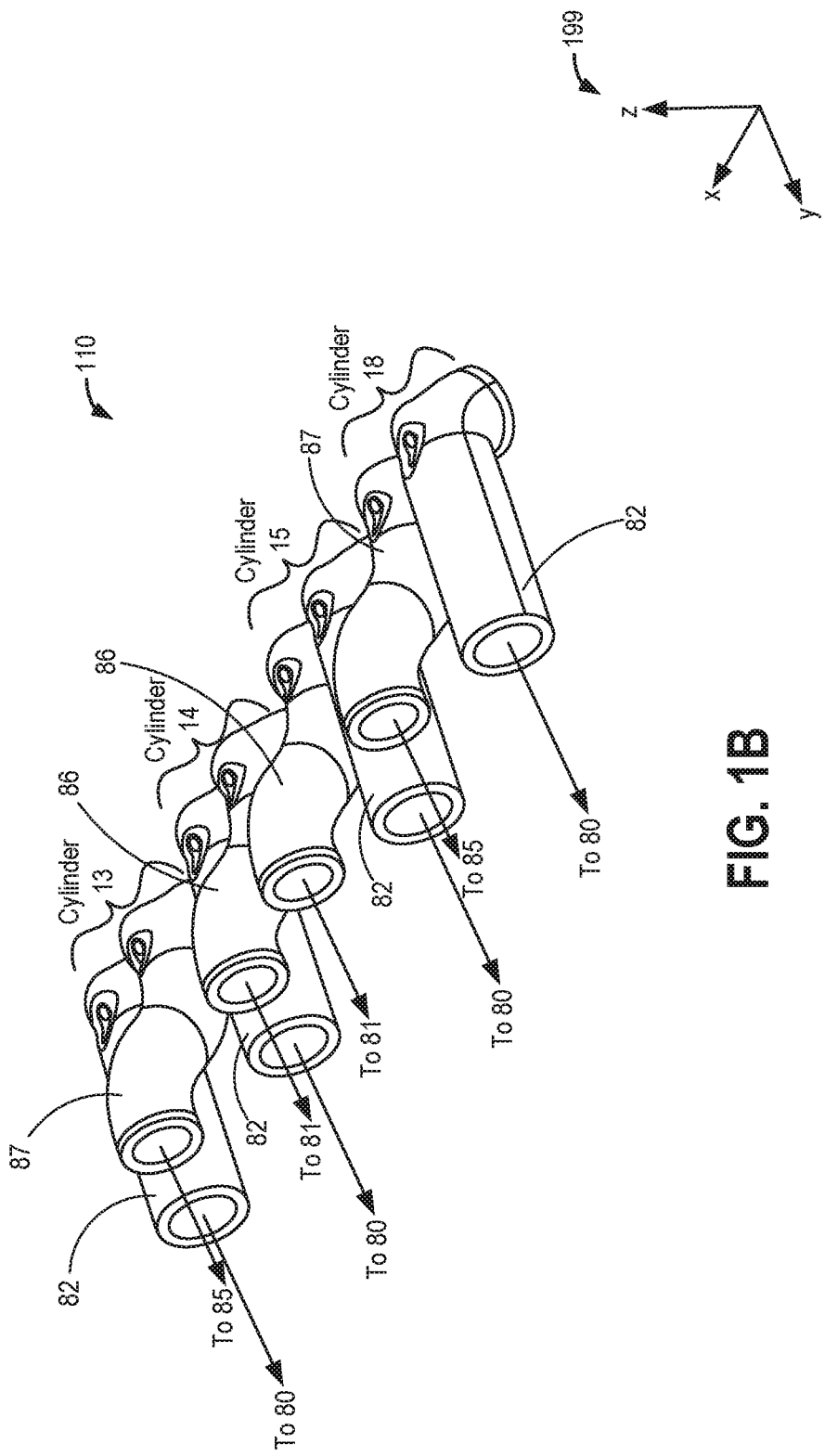
FIG. 1B shows a detailed view of a first example exhaust port arrangement of the split exhaust system of FIG. 1A.
Figure 1C:
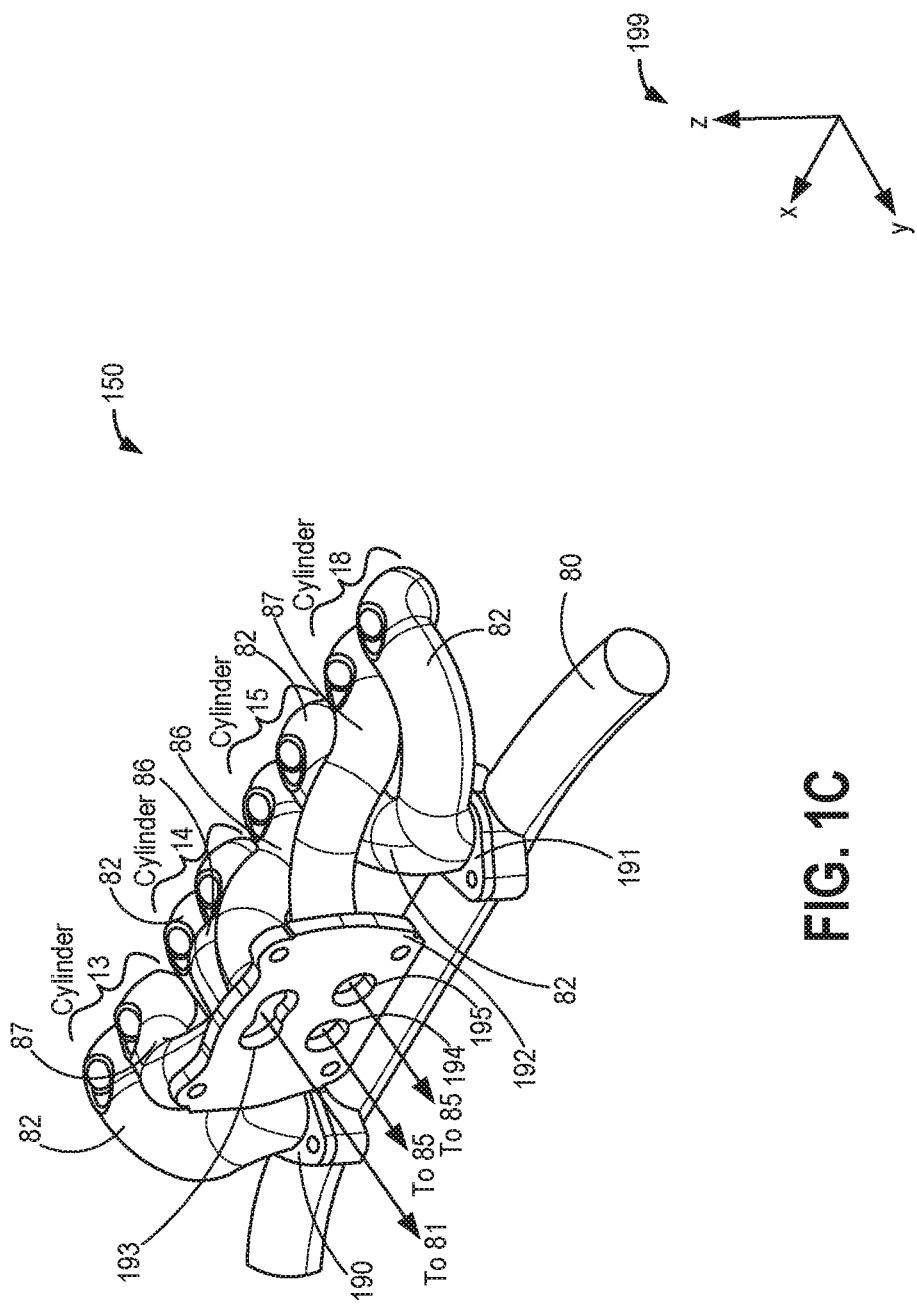
FIG. 1C shows a detailed view of a second example exhaust port arrangement of the split exhaust system of FIG. 1A.
Figure 2A:
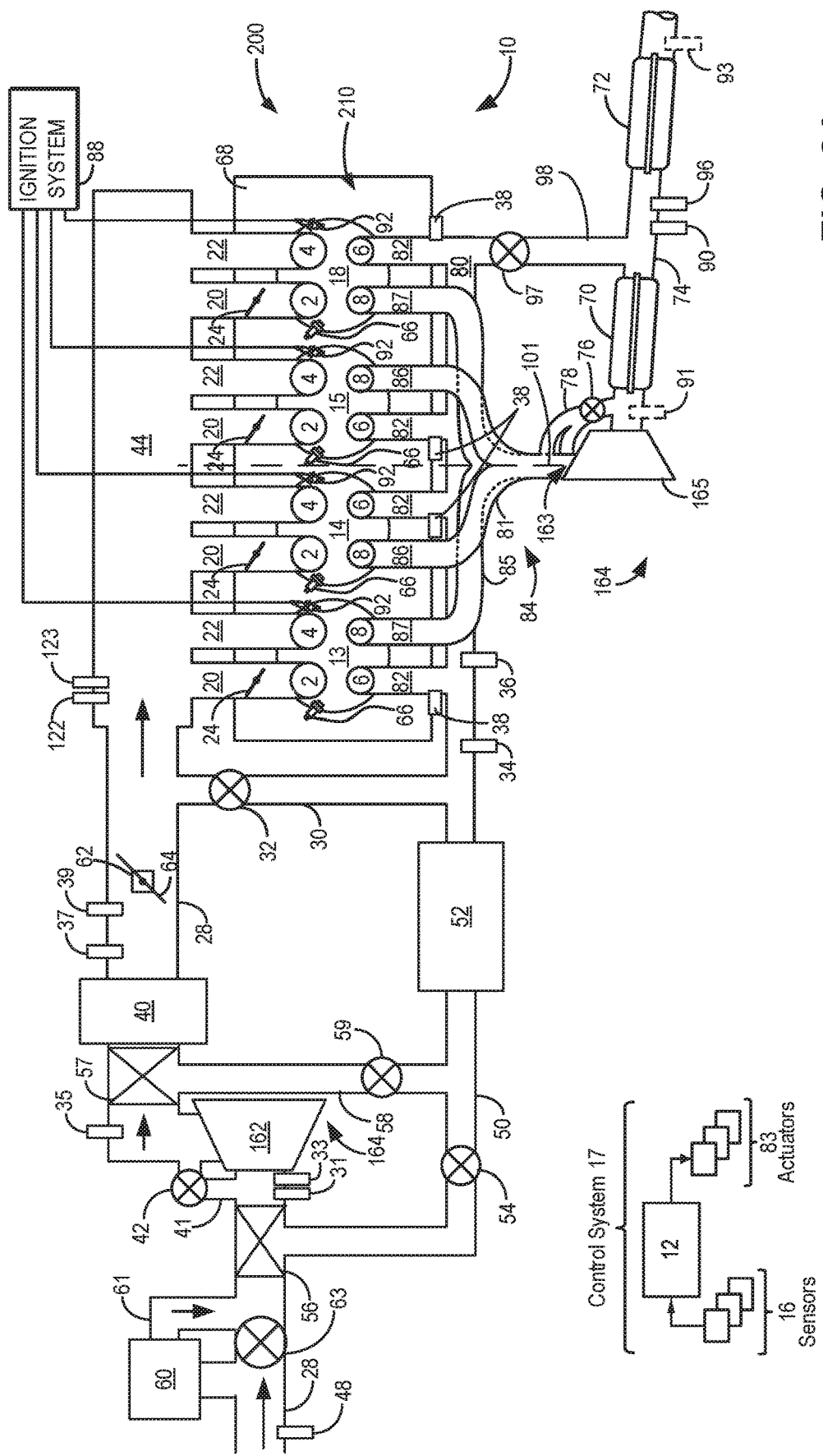
FIG. 2A shows a schematic depiction of turbocharged engine system including a second example of a split exhaust system.
Figure 3:
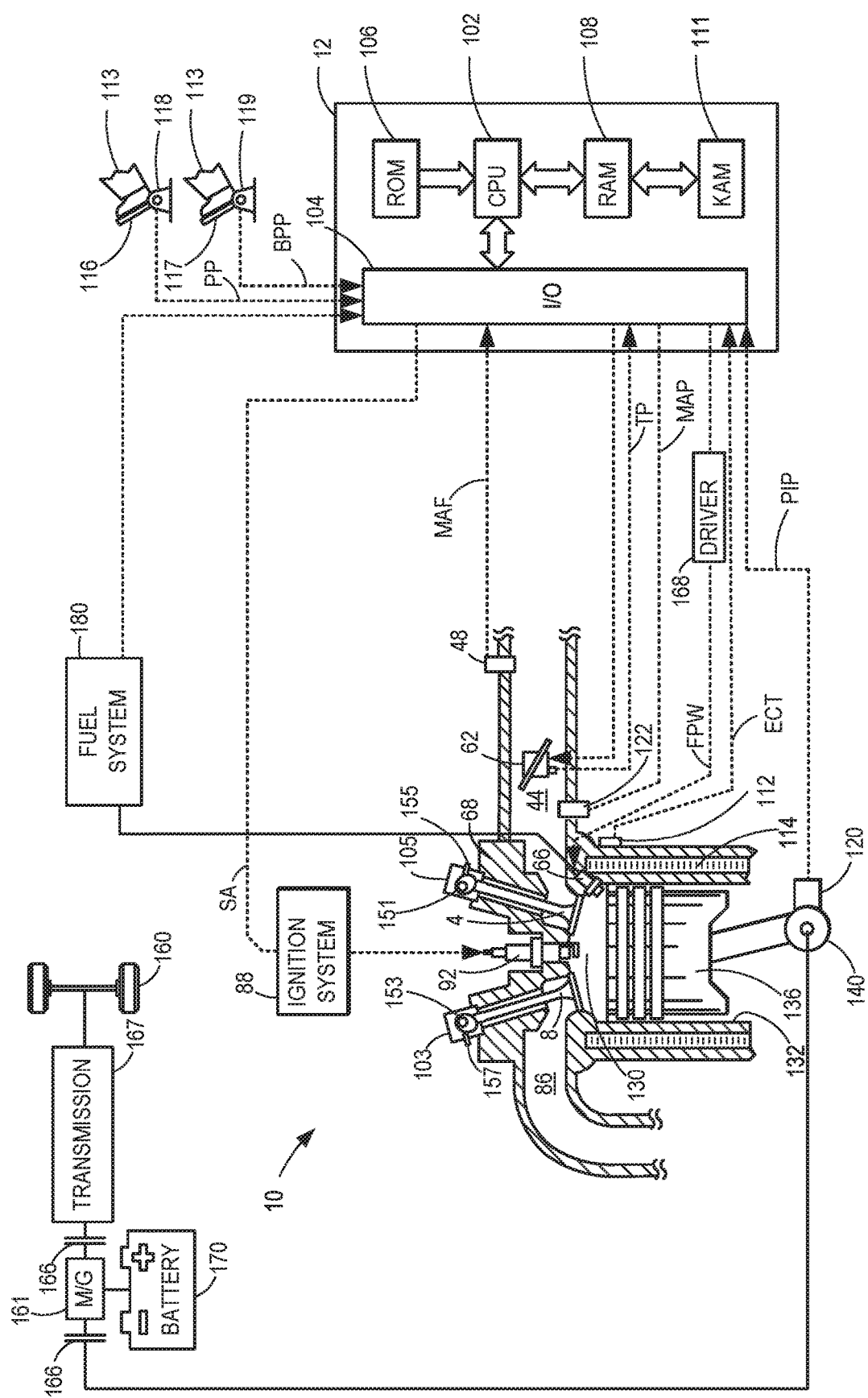
FIG. 3 shows an embodiment of a cylinder of the engine system of FIG. 1A or FIG. 2A.
Figure 4:
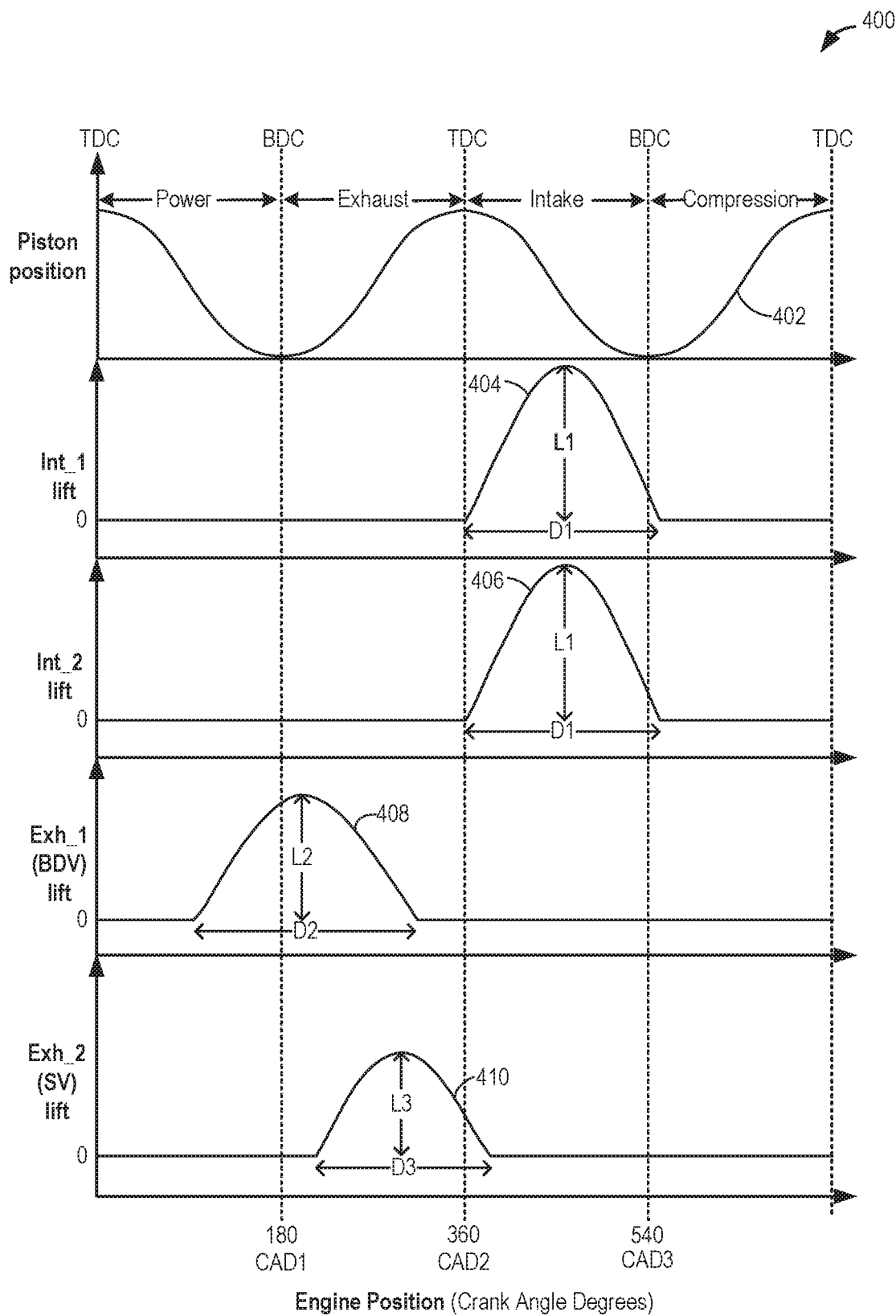
FIG. 4 shows exemplary cylinder intake valve and exhaust valve timings for one engine cylinder of a split exhaust engine system.
Figure 5:
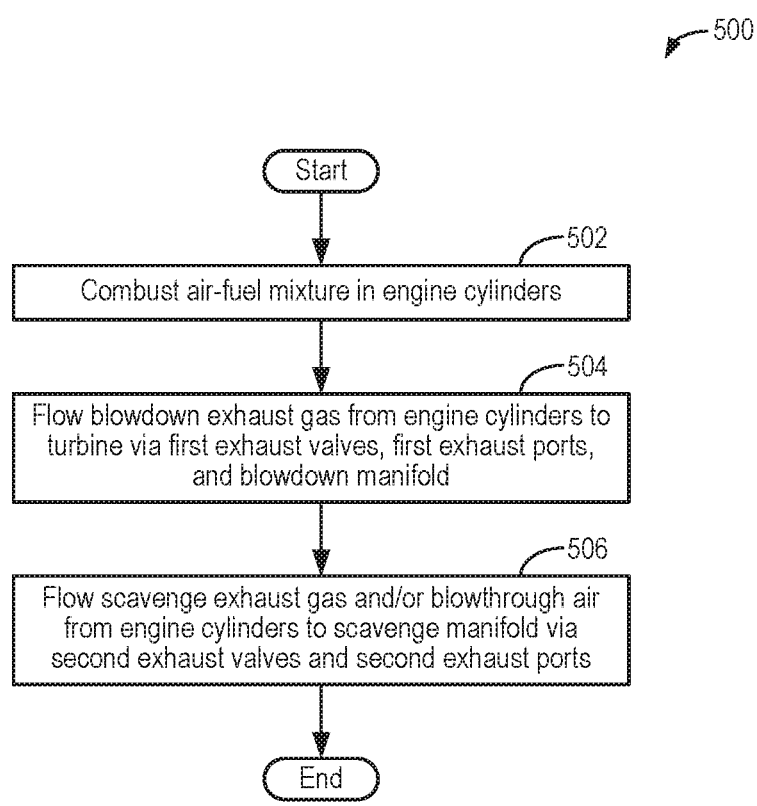
FIG. 5 shows an example method for flowing exhaust gas and blowthrough air through a split exhaust system.

The following description relates to systems and methods for a split exhaust engine, such as the engine system schematically shown in FIG. 1A or FIG. 2A. As shown in FIGS. 1A and 2A, the split exhaust engine includes a first exhaust manifold (referred to herein as a blowdown exhaust manifold) coupled exclusively to a blowdown exhaust valve and first exhaust port of each cylinder. The blowdown manifold is coupled to an exhaust passage of the engine, where the exhaust passage includes a turbocharger turbine and one or more emission control devices (which may include one or more catalysts). Further, the split exhaust engine includes a scavenge manifold coupled exclusively to a scavenge exhaust valve and a second exhaust port of each cylinder. The scavenge manifold is coupled to an intake passage upstream of a compressor of the turbocharger via a first EGR passage, which includes a first EGR valve (referred to herein as a BTCC valve). Additionally, in some examples, the split exhaust engine system may include various valve actuation mechanisms and may be installed in a hybrid vehicle, as shown in FIG. 3. The scavenge exhaust valves and blowdown exhaust valves for each cylinder may open and close at different times in an engine cycle in order to isolate scavenge and blowdown portions of combusted exhaust gases and direct these portions separately to the first and second scavenge manifolds and blowdown manifold, as shown at FIG. 4. In one example, the split exhaust engine includes an exhaust port configuration for reducing a blowdown volume delivered to the turbocharger turbine from each engine cylinder, such as the systems shown in FIGS. 1A-1C. In another example, the split exhaust engine includes a different exhaust port configuration for equalizing a blowdown volume delivered to the turbocharger turbine from each engine cylinder, such as the systems shown in FIGS. 2A-2C. An example method for operating the split exhaust engine to flow the blowdown exhaust to the blowdown manifold (and onto the turbocharger turbine) via the first exhaust ports and flow the scavenge exhaust to the scavenge manifold via the second exhaust ports is shown at FIG. 5.

Turning now to the figures, FIG. 1A shows a schematic diagram of an engine system including a multi-cylinder internal combustion engine 10, which may be included in a propulsion system of a vehicle. Engine 10 includes a plurality of combustion chambers (e.g., cylinders), which may be capped on the top by a cylinder head 68. In the example shown in FIG. 1A, engine 10 includes cylinders 13, 14, 15, and 18, arranged in an inline-4 configuration. However, it should be understood that although FIG. 1A shows four cylinders, engine 10 may include any number of cylinders in any configuration, e.g., V-6, I-6, V-12, opposed 4, etc. Further, the cylinders shown in FIG. 1A may have a cylinder configuration, such as the cylinder configuration shown in FIG. 3, as will be further described below.

Cylinder head 68 includes a central axis (e.g., centerline) 101. FIG. 1A shows the cylinders symmetrically arranged on either side of the central axis 101 (e.g., cylinders 13 and 14 are symmetrically arranged with cylinders 15 and 18). Cylinders 14 and 15 are referred to herein as the inner (or inside) cylinders, as cylinders 14 and 15 are the closest cylinders to central axis 101, which is positioned between cylinders 14 and 15. Cylinders 13 and 18 are referred to herein as the outer (or outside) cylinders, as cylinders 13 and 18 are the furthest cylinders from central axis 101 and are arranged outside the inner cylinders 14 and 15 relative to the central axis 101. Each of cylinders 13, 14, 15, and 18 include two intake valves, including a first intake valve 2 and a second intake valve 4, and two exhaust valves, including a first exhaust valve (referred to herein as a blowdown exhaust valve, or blowdown valve) 8 and a second exhaust valve (referred to herein as a scavenge exhaust valve, or scavenge valve) 6. The intake valves and exhaust valves may be referred to herein as cylinder intake valves and cylinder exhaust valves, respectively. As explained below with reference to FIG. 3, a timing (e.g., opening timing, closing timing, opening duration, etc.) of each of the intake valves may be controlled via various camshaft timing systems. In one example, both of the first intake valves 2 and the second intake valves 4 may be controlled to a same valve timing, such that they open and close at the same time in the engine cycle. In an alternative example, the first intake valves 2 and the second intake valves 4 may be controlled at a different valve timing. Further, the first exhaust valves 8 may be controlled at a different valve timing than the second exhaust valves 6, such that the first exhaust valve and the second exhaust valve of a same cylinder open and close at different times than one another and the intake valves, as further discussed below.

Each cylinder receives intake air (or a mixture of intake air and recirculated exhaust gas, as will be elaborated below) from an intake manifold 44 via an air intake passage 28. Intake manifold 44 is coupled to the cylinders via intake ports (e.g., runners). For example, intake manifold 44 is shown coupled to each first intake valve 2 of each cylinder via a first intake port 20. Further, the intake manifold 44 is coupled to each second intake valve 4 of each cylinder via a second intake port 22. In this way, each cylinder intake port can selectively communicate with the cylinder it is coupled to via a corresponding one of the first intake valves 2 or second intake valves 4. Each intake port may supply air, recirculated exhaust gas, and/or fuel to the cylinder it is coupled to for combustion. In this example, the intake port and valve arrangement is alternating between the first intake port and the second intake port. In some embodiments, the intake ports and valves may not alternate and may be arranged to match the exhaust port arrangement. For the intake valves and ports may be arranged such that the first intake valve 2 of each cylinder is directly across from first exhaust valve 8 of each cylinder.

One or more of the intake ports may include a charge motion control device, such as a charge motion control valve (CMCV). As shown in FIG. 1A, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1A, each CMCV 24 may include a valve plate; however, other configurations of the valve are possible. Note that for the purposes of this disclosure, the CMCV 24 is in the "closed" (e.g., fully closed) position when it is fully activated and the valve plate is fully tilted into the respective first intake port 20, thereby resulting in maximum air charge flow obstruction. Alternatively, the CMCV 24 is in the "open" (e.g., fully open) position when deactivated and the valve plate is fully rotated to lie substantially parallel with airflow, thereby considerably minimizing or eliminating airflow charge obstruction. The CMCVs may be principally maintained in their "open" position and may only be activated "closed" when swirl conditions are desired. As shown in FIG. 1A, only one intake port of each cylinder includes CMCV 24. However, in other examples, both intake ports of each cylinder may include a CMCV 24. A controller 12 may actuate CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active. As referred to herein, blowthrough air or blowthrough combustion cooling (BTCC) may refer to intake air that flows from the one or more intake valves of each cylinder to second exhaust valves 6 during a valve opening overlap period between the intake valves and second exhaust valves 6 (e.g., a period when both the intake valves and second exhaust valves 6 are open at the same time), without combusting the blowthrough air.

A high pressure, dual stage fuel system (such as the fuel system shown in FIG. 3) may be used to generate fuel pressures at a fuel injector 66 coupled to each cylinder. As such, fuel may be directly injected into the cylinders via fuel injectors 66. A distributorless ignition system 88 provides an ignition spark to cylinders 13, 14, 15, and 18 via spark plugs 92 in response to a signal from controller 12 to initiate combustion.

Cylinders 13, 14, 15, and 18 are each coupled to two exhaust ports for channeling blowdown and scavenging portions of the combustion gases separately via a split exhaust system 100. Specifically, as shown in FIG. 1A, cylinders 14 and 15 exhaust a first, blowdown portion of the combustion gases to a first manifold portion 81 of a first exhaust manifold (also referred to herein as a blowdown manifold) 84 via first exhaust ports (e.g., runners) 86 and a second, scavenging portion of the combustion gases to a second exhaust manifold (also referred to herein as a scavenge manifold) 80 via second exhaust ports (e.g., runners) 82. Cylinders 13 and 18 exhaust the first blowdown portion of the combustion gases to a second manifold portion 85 of first exhaust manifold 84 via first exhaust ports 87 and the second, scavenging portion to second exhaust manifold 80 via second exhaust ports 82. That is, first exhaust ports 87 of cylinders 13 and 18 extend from cylinders 13 and 18 to the second manifold portion 85 of first exhaust manifold 84, whereas first exhaust ports 86 of cylinders 14 and 15 extend from cylinders 14 and 15 to the first manifold portion 81 of first exhaust manifold 84 (portions of the second manifold portion 85 that are obscured by the first manifold portion 81 are shown by dashed lines for clarity). Second exhaust ports 82 extend from cylinders 13, 14, 15, and 18 to second exhaust manifold 80.

Each exhaust port can selectively communicate with the cylinder it is coupled to via the corresponding exhaust valve. For example, second exhaust ports 82 communicate with their respective cylinders via second exhaust valves 6, and first exhaust ports 86 and 87 communicate with their respective cylinders via first exhaust valves 8. Second exhaust ports 82 are isolated from first exhaust ports 86 and 87 when at least one exhaust valve of each cylinder is in a closed position. Exhaust gases may not flow directly between second exhaust ports 82 and first exhaust ports 86 and 87. The exhaust system described above may be referred to herein as a split exhaust system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another, and thus the first and second portions of exhaust gases do not mix with one another within the first and second exhaust manifolds).

Engine 10 is shown having a turbocharger 164, including a turbine 165 and an intake compressor 162 coupled on a common shaft (not shown). In some examples, turbine 165 may be a twin scroll (or dual volute) turbine. In such examples, a first scroll of the twin scroll turbine may be coupled to first manifold portion 81, and a second scroll of the twin scroll turbine may be coupled to second manifold portion 85 such that first manifold portion 81 and second manifold portion 85 remain separated up to the turbine wheel. Further, the first scroll may wrap further around the turbine wheel than the second scroll, thereby occupying a greater volume than the second scroll. For example, the two scrolls may each introduce gas around the entire perimeter of the wheel, but at different axial locations. Alternatively, the two scrolls may each introduce gas to the turbine over a portion of the perimeter, such as approximately 180 degrees. In another example, engine 10 may include a monoscroll turbine. In some examples of the monoscroll turbine, first manifold portion 81 and second manifold portion 85 may combine prior to reaching the turbine wheel. The twin scroll configuration may provide greater power to the turbine wheel compared with the monoscroll configuration by providing a minimum volume (e.g., blowdown exhaust from two cylinders and a smaller manifold volume) from a given blowdown event. The monoscroll configuration includes a greater volume for each blowdown event (e.g., blowdown exhaust from four cylinders and a larger manifold volume), but enables lower cost turbines that have higher temperature tolerances to be used. Further, in some examples of the monoscroll configuration, first exhaust ports 86 and 87 from each of cylinders 13, 14, 15, and 18 may be joined together in cylinder head 68 such that blowdown exhaust from each of the cylinders exits cylinder head 68 through a single passage, as will be further described below with respect to FIG. 1C.

Rotation of turbine 165 drives rotation of compressor 162, disposed within the intake passage 28. As such, the intake air becomes boosted (e.g., pressurized) at the compressor 162 and travels downstream to intake manifold 44. Exhaust gases exit turbine 165 into an exhaust passage 74. A wastegate may be coupled across turbine 165. Specifically, a wastegate valve 76 may be included in a bypass 78 coupled between each of the first manifold portion 81 and the second manifold portion 85, upstream of an inlet 163 to turbine 165, and exhaust passage 74, downstream of an outlet of turbine 165. Wastegate valve 76 may control an amount of exhaust gas flowing through bypass 78 and to the outlet of turbine 165. For example, as an opening of wastegate valve 76 increases, an amount of exhaust gas flowing through bypass 78 and not through turbine 165 may increase, thereby decreasing an amount of power available for driving turbine 165 and compressor 162. As another example, as the opening of wastegate valve decreases, the amount of exhaust gas flowing through bypass 78 decreases, thereby increasing the amount of power available for driving turbine 165 and compressor 162. In this way, a position of wastegate valve 76 controls an amount of boost provided by turbocharger 164.

Split exhaust system 100 includes a mirrored (e.g., having reflective symmetry about central axis 101) exhaust port and manifold arrangement for optimized energy recovery at turbine 165. The mirrored exhaust port and manifold arrangement of split exhaust system 100 increases energy recovery at turbine 165 by minimizing a distance (e.g., volume) between (first) blowdown exhaust valves 8 and the turbine inlet 163. In particular, the first exhaust ports 86 and 87 and the second exhaust ports 82 have a non-alternating pattern across cylinders 13, 14, 15, and 18 and along cylinder head 68. In the example of FIG. 1A, the inlet 163 to turbine 165 is centered between the inner cylinders 14 and 15, along central axis 101, and the exhaust port that is the closest to central axis 101 on each cylinder (and therefore to the turbine inlet 163) is the first exhaust port 86 or 87. For example, central axis 101 forms a plane of symmetry (e.g., reflective symmetry) between first exhaust port 86 of cylinder 14 and first exhaust port 86 of cylinder 15. As such, an arrangement of first exhaust port 87 and second exhaust port 82 on cylinder 13 is a non-superimposable mirror image of an arrangement of first exhaust port 87 and second exhaust port 82 on cylinder 18, and an arrangement of first exhaust port 86 and second exhaust port 82 on cylinder 14 is a non-superimposable mirror image of an arrangement of first exhaust port 86 and second exhaust port 82 on cylinder 15. In contrast, if the exhaust ports were in an alternating pattern, the relative arrangement of the first and second exhaust ports would be the same on each of cylinders 13, 14, 15, and 18, with no plane of symmetry at central axis 101 or elsewhere in cylinder head 68 for the exhaust port pattern. As shown in FIG. 1A, this positioning of the exhaust ports and the centering of the turbine inlet 163 decreases a distance from each of the first exhaust ports 86 and 87 to the turbine inlet 163, thereby decreasing a fluid volume of each of the first exhaust ports 86 and 87. In other examples, turbine inlet 163 may not be centered along central axis 101. However, not centering turbine inlet 163 may increase the distance from at least a subset of the first exhaust ports 86 and 87 to the turbine inlet 163.

In the example shown in FIG. 1A, split exhaust system 100 includes a first example exhaust port and manifold arrangement 110. In particular, exhaust port and manifold arrangement 110 may be included when turbine 165 is a twin scroll turbine in order to deliver blowdown pulses from inside cylinders 14 and 15 to a first scroll of the twin scroll turbine (e.g., via first exhaust ports 86 and first manifold portion 81) and deliver blowdown pulses from outside cylinders 13 and 18 to a second scroll of the twin scroll turbine (e.g., via first exhaust ports 87 and second manifold portion 85).

Turning briefly to FIG. 1B, a three-dimensional partial perspective view of first example exhaust port and manifold arrangement 110 is shown. Thus, like components of FIGS. 1A and 1B are numbered the same and may not be reintroduced. Reference axes 199 are provided for relative spatial orientation. Similar to FIG. 1A, FIG. 1B shows first exhaust port 86 of cylinder 14 arranged adjacent to (e.g., in the x-direction of reference axes 199) first exhaust port 86 of cylinder 15, without any other exhaust port positioned therebetween. Further, second exhaust port 82 of cylinder 14 is arranged adjacent to first exhaust port 87 of cylinder 13 (e.g., in the x-direction), and second exhaust port 82 of cylinder 15 is arranged adjacent to first exhaust port 87 of cylinder 18 (e.g., in the x-direction). Additionally, as shown in FIG. 1B, the first exhaust ports 86 and 87 may exit the cylinder head (not shown in FIG. 1B) vertically above (e.g., in a more positive z-direction, according to reference axes 199) second exhaust ports 82. The particular shapes of the exhaust ports and the locations at which first exhaust ports 86 combine with each other and first exhaust ports 87 combine with each other may be optimized to minimize a blowdown volume for each scroll of the twin scroll turbine 165 (not shown in FIG. 1B).

In the example shown in FIG. 1B, each of the first exhaust ports 86 and 87 exit the cylinder head (not shown) separately. In other examples, such as described below with respect to FIG. 1C, first exhaust ports 86 may combine prior to exiting the cylinder head and/or first exhaust ports 87 may combine prior to exiting the cylinder head. However, in each example, first exhaust ports 86 may flow exhaust gas only to first manifold portion 81, and first exhaust ports 87 may flow exhaust gas only to second manifold portion 85. As such, first exhaust ports 86 do not combine with first exhaust ports 87 prior to exiting the cylinder head or after exiting the cylinder head. Conversely, in examples where turbine 165 is a monoscroll turbine, any or all of first exhaust ports 86 and first exhaust ports 87 may combine prior to exiting the cylinder head or after exiting the cylinder head.

Turning now to FIG. 1C, a three-dimensional partial perspective view of a second example exhaust port and manifold arrangement 150 is shown. Second example exhaust port and manifold arrangement 150 may be included in split exhaust system 100 of FIG. 1A, for example. As such, like components of FIG. 1C and FIGS. 1A-1B are numbered the same and will not be reintroduced. Similar to FIGS. 1A and 1B, FIG. 1C shows first exhaust port 86 of cylinder 14 arranged adjacent to (e.g., in the x-direction of reference axes 199) first exhaust port 86 of cylinder 15, without any other exhaust port positioned therebetween. Further, second exhaust port 82 of cylinder 14 is arranged adjacent to first exhaust port 87 of cylinder 13 (e.g., in the x-direction), and second exhaust port 82 of cylinder 15 is arranged adjacent to first exhaust port 87 of cylinder 18 (e.g., in the x-direction). In the example shown in FIG. 1C, second exhaust ports 82 of cylinders 13 and 14 combine prior to exiting the cylinder head (not shown), and second exhaust ports 82 of cylinders 15 and 18 combine prior to exiting the cylinder head. For example, second exhaust ports 82 of cylinders 13 and 14 combine to a single passage to exit the cylinder head at a first mounting flange 190, which couples the combined second exhaust ports 82 of cylinders 13 and 14 to second exhaust manifold 80, and second exhaust ports 82 of cylinders 15 and 18 combine to a single passage to exit the cylinder head at a second mounting flange 191, which couples the combined second exhaust ports 82 of cylinders 15 and 18 to second exhaust manifold 80. Further, first exhaust ports 86 combine at a third mounting flange 192, which may couple first exhaust ports 86 to first manifold portion 81 (not shown in FIG. 1C) and flow exhaust gas from first exhaust ports 86 to first manifold portion 81 via a single, combined outlet 193. In the example shown in FIG. 1C, third mounting flange 192 also couples first exhaust ports 87 to second manifold portion 85 (not shown in FIG. 1C). However, first exhaust ports 87 flow exhaust gas to second manifold portion 85 via separate outlets in the depicted example. For example, exhaust gas flows from first exhaust port 87 of cylinder 13 to second manifold portion 85 via an outlet 194 in mounting flange 192, and exhaust gas flows from first exhaust port 87 of cylinder 18 to second manifold portion 85 via an outlet 195 in mounting flange 192, which is separate from outlet 194 (and separate from combined outlet 193). In other examples, first exhaust ports 87 may combine at third mounting flange 192, and exhaust gas may flow from first exhaust ports 87 to second manifold portion 85 via a single, combined outlet. In still other examples where turbine 165 (not shown in FIG. 1C) is a monoscroll turbine, a single exhaust passage may channel exhaust from third mounting flange 192 to the turbine. For example, first exhaust port 87 of cylinder 13, first exhaust port 86 of cylinder 14, first exhaust port 86 of cylinder 15, and first exhaust port 87 of cylinder 18 may all combine within the cylinder head, and exhaust flow from each of the first exhaust ports 87 and 86 may exit the cylinder head via a single, combined outlet in mounting flange 192.

In the example shown in FIG. 1C, first exhaust port 87 of cylinder 13 curves vertically above (e.g., in a more positive z-direction) second exhaust port 82 of cylinder 14 and toward the central axis 101 of the cylinder head (shown in FIG. 1A) to reach third mounting flange 192. Similarly, first exhaust port 87 of cylinder 18 curves vertically above second exhaust port 82 of cylinder 15 toward the central axis 101 to reach third mounting flange 192. First exhaust ports 87 are coupled to third mounting flange 192 vertically below first exhaust ports 86. For example, due to the greater horizontal distance (e.g., in the x-direction) of first exhaust ports 87 from the central axis, coupling first exhaust ports 87 to mounting flange 192 vertically below first exhaust ports 86 may decrease a volume of first exhaust ports 87 compared with coupling first exhaust ports 87 to mounting flange 192 vertically above first exhaust ports 86. The particular shapes of the exhaust ports and the locations at which they combine may be optimized to minimize the blowdown volume.

Returning to FIG. 1A, the particular non-alternating pattern of the exhaust ports of split exhaust system 100 reduces a distance (and thus volume) between each blowdown exhaust valve 8 and turbine 165. If instead the first and second exhaust ports alternated along cylinder head 68, the distance (and thus volume) between blowdown exhaust valves 8 and the turbine inlet 163 may be increased. For example, if first exhaust port 87 of cylinder 13 and first exhaust port 86 of cylinder 14 were arranged to the left of the second exhaust ports 82 (in the view shown in FIG. 1A), the distance between blowdown exhaust valve 8 of cylinder 13 and blowdown exhaust valve 8 of cylinder 14 to turbine 165 would be increased. Further, by centering the turbine inlet 163 between inner cylinders 14 and 15, a first distance between blowdown exhaust valve 8 of cylinder 14 and the turbine inlet 163 is equalized with a second distance between blowdown exhaust valve 8 of cylinder 15 and the turbine inlet 163, and a third distance between blowdown exhaust valve 8 of cylinder 13 is equalized with a fourth distance between blowdown exhaust valve 8 of cylinder 18 and the turbine inlet 163.

After exiting turbine 165, exhaust gases flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way catalysts. In other examples, emission control devices 70 and 72 may include one or a plurality of a diesel oxidation catalyst (DOC) and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12, which is included in a control system 17, as will be further described below. As shown in FIG. 1A, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as a second oxygen sensor 91 positioned between turbine 165 and first emission control device 70 and/or a third oxygen sensor 93 positioned downstream of second emission control device 72. As such, second oxygen sensor 91 may be configured to measure the oxygen content of the exhaust gas entering first emission control device 70, and third oxygen sensor 93 may be configured to measure the oxygen content of exhaust gas exiting second emission control device 72. In one example, one or more of oxygen sensor 90, oxygen sensor 91, and oxygen sensor 93 may be universal exhaust gas oxygen (UEGO) sensors. Alternatively, a two-state exhaust gas oxygen sensor may be substituted for one or more of oxygen sensors 90, 91, and 93. Exhaust passage 74 may include various other sensors, such as one or more temperature and/or pressure sensors. For example, as shown in FIG. 1A, a pressure sensor 96 is positioned within exhaust passage 74 between first emission control device 70 and second emission control device 72. As such, pressure sensor 96 may be configured to measure the pressure of exhaust gas entering second emission control device 72.

Both pressure sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as a scavenge manifold bypass valve, SMBV) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is a coupled directly between second exhaust manifold 80 and intake passage 28, upstream of compressor 162 (and thus, first EGR passage 50 may be referred to as a low-pressure EGR passage). As such, exhaust gases (or blowthrough air, as explained further below) is directed from second exhaust manifold 80 to air intake passage 28, upstream of compressor 162, via first EGR passage 50. As shown in FIG. 1A, first EGR passage 50 may include an EGR cooler 52 configured to cool exhaust gases flowing from second exhaust manifold 80 to intake passage 28 and may further include a first EGR valve 54 (which may be referred to herein as a BTCC valve) disposed therein. Controller 12 is configured to actuate and adjust a position of BTCC valve 54 in order to control a flow rate and/or amount through first EGR passage 50. When the BTCC valve 54 is in a closed (e.g., fully closed) position, no exhaust gases or intake air may flow from second exhaust manifold 80 to intake passage 28, upstream of compressor 162. Further, when the BTCC valve 54 is in an open position, exhaust gases and/or blowthrough air may flow from second exhaust manifold 80 to intake passage 28, upstream of compressor 162. Controller 12 may additionally adjust the BTCC valve 54 into a plurality of positions between fully open and fully closed. In other examples, controller 12 may only adjust BTCC valve 54 to be either fully open or fully closed.

A first ejector 56 is positioned at an outlet of EGR passage 50, within intake passage 28. First ejector 56 may include a constriction or venturi that provides a pressure increase at the inlet of compressor 162. As a result, EGR from EGR passage 50 may be mixed with fresh air flowing through intake passage 28 to compressor 162. Thus, EGR from EGR passage 50 may act as the motive flow on first ejector 56. In an alternative example, there may not be an ejector positioned at the outlet of EGR passage 50. Instead, an outlet of compressor 162 may be shaped as an ejector that lowers the gas pressure to assist in EGR flow (and thus, in this example, air is the motive flow and EGR is the secondary flow). In yet another example, EGR from EGR passage 50 may be introduced at a trailing edge of a blade of compressor 162, thereby allowing blowthrough air to be delivered to intake passage 28 via EGR passage 50.

A second EGR passage 58 is coupled between first EGR passage 50 and intake passage 28. Specifically, as shown in FIG. 1A, second EGR passage 58 is coupled to first EGR passage 50 between BTCC valve 54 and EGR cooler 52. In other examples, when second EGR passage 58 is included in the engine system, the system may not include EGR cooler 52. Additionally, second EGR passage 58 is directly coupled to intake passage 28, downstream of compressor 162. Further, as shown in FIG. 1A, second EGR passage 58 is coupled to intake passage 28 upstream of a charge air cooler (CAC) 40. CAC 40 is configured to cool intake air (which may be a mixture of fresh intake air from outside of the engine system and recirculated exhaust gases) as it passes through CAC 40. As such, recirculated exhaust gases from first EGR passage 50 and/or second EGR passage 58 may be cooled via CAC 40 before entering intake manifold 44. In an alternative example, second EGR passage 58 may be coupled to intake passage 28 downstream of CAC 40. In such an example, there may be no EGR cooler 52 disposed within first EGR passage 50. Further, as shown in FIG. 1A, a second ejector 57 may be positioned within intake passage 28 at an outlet of second EGR passage 58.

A second (e.g., mid-pressure) EGR valve 59 is disposed within second EGR passage 58. Second EGR valve 59 is configured to adjust an amount of gas flow (e.g., blowthrough air and/or exhaust) through second EGR passage 58. As further described below, controller 12 may actuate EGR valve 59 into an open (e.g., fully open) position (allowing minimally restricted flow thorough second EGR passage 58), a closed (e.g., fully closed) position (blocking flow through second EGR passage 58), or plurality of positions between fully open and fully closed based on (e.g., as a function of) engine operating conditions. For example, actuating EGR valve 59 may include the controller 12 sending an electronic signal to an actuator of EGR valve 59 to move a valve plate of EGR valve 59 into the open position, the closed position, or some position between fully open and fully closed. Based on system pressures and positions of various other valves in the engine system, air may either flow toward intake passage 28 within second EGR passage 58 or toward second exhaust manifold 80 within second EGR passage 58.

Intake passage 28 further includes an intake throttle 62. As shown in FIG. 1A, intake throttle 62 is positioned downstream of CAC 40. A position of a throttle plate 64 of throttle 62 may be adjusted by controller 12 via a throttle actuator (not shown) communicatively coupled to controller 12. By modulating intake throttle 62 while operating compressor 162, a desired amount of fresh air and/or recirculated exhaust gas may be cooled by CAC 40 and delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from the compressor outlet, upstream of CAC 40, to the compressor inlet. A compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80, and a second end of third flow passage 30 is directly coupled to intake passage 28, downstream of intake throttle 62 and upstream of intake manifold 44. A third valve 32 (e.g., a hot pipe valve) is disposed within third flow passage 30 and is configured to adjust an amount of air flow through third flow passage 30. Third valve 32 may be actuated into a fully open position, a fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1A, second exhaust manifold 80 includes a pressure sensor 34 and oxygen sensor 36 disposed therein and configured to measure a pressure and oxygen content, respectively, of exhaust gases and blowthrough (e.g., intake) air exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38 and/or oxygen sensor 36.

In some examples, as shown in FIG. 1A, intake passage 28 may include an electric compressor 60. Electric compressor 60 is disposed in a bypass passage 61, which is coupled to intake passage 28 upstream and downstream of an electric compressor valve 63. Specifically, an inlet to bypass passage 61 is coupled to intake passage 28 upstream of electric compressor valve 63, and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1A. When additional boost (e.g., increased pressure of the intake air above atmospheric pressure) is requested over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1A, intake passage 28 includes a mass air flow (MAF) sensor 48 disposed upstream of electric compressor valve 63 in intake passage 28. An intake pressure sensor 31 and an intake temperature sensor 33 are positioned in intake passage 28 upstream of compressor 162 and downstream of where first EGR passage 50 couples to intake passage 28. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62. In some examples, as shown in FIG. 1A, an additional intake oxygen sensor 39 may be positioned in intake passage 28 between CAC 40 and throttle 62. Further, an intake manifold pressure (e.g., MAP) sensor 122 and an intake manifold temperature sensor 123 are positioned within intake manifold 44, upstream of the engine cylinders.

In some examples, engine 10 may be coupled to an electric motor/battery system (as shown in FIG. 3) in a hybrid vehicle. The hybrid vehicle may have a parallel configuration, a series configuration, or variations or combinations thereof. Further, in some examples, other engine configurations may be employed, for example a diesel engine.

Engine 10 may be controlled at least partially by control system 17, including controller 12, and by input from a vehicle operator via an input device (not shown in FIG. 1A). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, exhaust passage 74, and second exhaust manifold 80 described above. Other sensors may include a throttle inlet temperature sensor for estimating a throttle air temperature (TCT) coupled downstream of throttle 62 in the intake passage. Additional system sensors and actuators are elaborated below with reference to FIG. 3. As another example, actuators 83 may include fuel injectors 66, valves 63, 42, 54, 59, 32, 97, 76, and throttle 62. Actuators 83 may further include various camshaft timing actuators coupled to the cylinder intake and exhaust valves (as described below with reference to FIG. 3). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 5. For example, operation of first exhaust valve 8, second exhaust valve 6, and intake valves 2 and 4 may be timed for a desired gas flow through each cylinder port.

It should be noted that while FIG. 1A shows engine 10 including each of first EGR passage 50, second EGR passage 58, flow passage 98, and flow passage 30, in other examples, engine 10 may only include a portion of these passages. For example, engine 10 may only include first EGR passage 50 and flow passage 98 and not include second EGR passage 58 and flow passage 30. In another example, engine 10 may include first EGR passage 50, second EGR passage 58, and flow passage 98, but not include flow passage 30. In yet another example, engine 10 may include first EGR passage 50, flow passage 30, and flow passage 98, but not second EGR passage 58. In some examples, engine 10 may not include electric compressor 60. In still other examples, engine 10 may include all or only a portion of the sensors shown in FIG. 1A.

While split exhaust system 100 may be configured to optimize energy recovery at turbine 165, alternative configurations may be used to optimize other performance characteristics of the turbine. For example, FIG. 2A schematically shows an engine system (including engine 10) that includes a split exhaust system 200 that is optimized for turbine balance. As such, components previously introduced in FIG. 1A are represented with the same reference numbers and are not re-introduced. For example, the engine system shown in FIG. 2A is substantially identical to the engine system introduced in FIG. 1A aside from the differences described below.

Similar to split exhaust system 100 of FIG. 1A, split exhaust system 200 of FIG. 2A includes a mirrored (e.g., having reflective symmetry about central axis 101) exhaust port and manifold configuration, but unlike split exhaust system 100 of FIG. 1A, split exhaust system 200 is configured to achieve a consistent distance (e.g., volume) between (first) blowdown exhaust valves 8 and the turbine inlet 163. The exhaust port that is the furthest from central axis 101 (and the turbine inlet 163) on the inner cylinders 14 and 15 is first exhaust port 86, and the exhaust port that is the closest to central axis 101 (and the turbine inlet 163) on the outside cylinders 13 and 18 is first exhaust port 87. For example, central axis 101 is centered between second exhaust port 82 of cylinder 14 and second exhaust port 82 of cylinder 15, forming a plane of symmetry between second exhaust port 82 of cylinder 14 and second exhaust port 82 of cylinder 15. As such, an arrangement of first exhaust port 87 and second exhaust port 82 on cylinder 13 is a non-superimposable mirror image of an arrangement of first exhaust port 87 and second exhaust port 82 on cylinder 18, and an arrangement of first exhaust port 86 and second exhaust port 82 on cylinder 14 is a non-superimposable mirror image of an arrangement of first exhaust port 86 and second exhaust port 82 on cylinder 15.

In the example shown in FIG. 2A, split exhaust system 200 includes an example exhaust port and manifold arrangement 210. In particular, exhaust port and manifold arrangement 210 may be included when turbine 165 is a twin scroll turbine in order to deliver blowdown pulses from inside cylinders 14 and 15 to a first scroll of the twin scroll turbine (e.g., via first exhaust ports 86 and first manifold portion 81) and deliver blowdown pulses from outside cylinders 13 and 18 to a second scroll of the twin scroll turbine (e.g., via first exhaust ports 87 and second manifold portion 85).

Figure 2B:
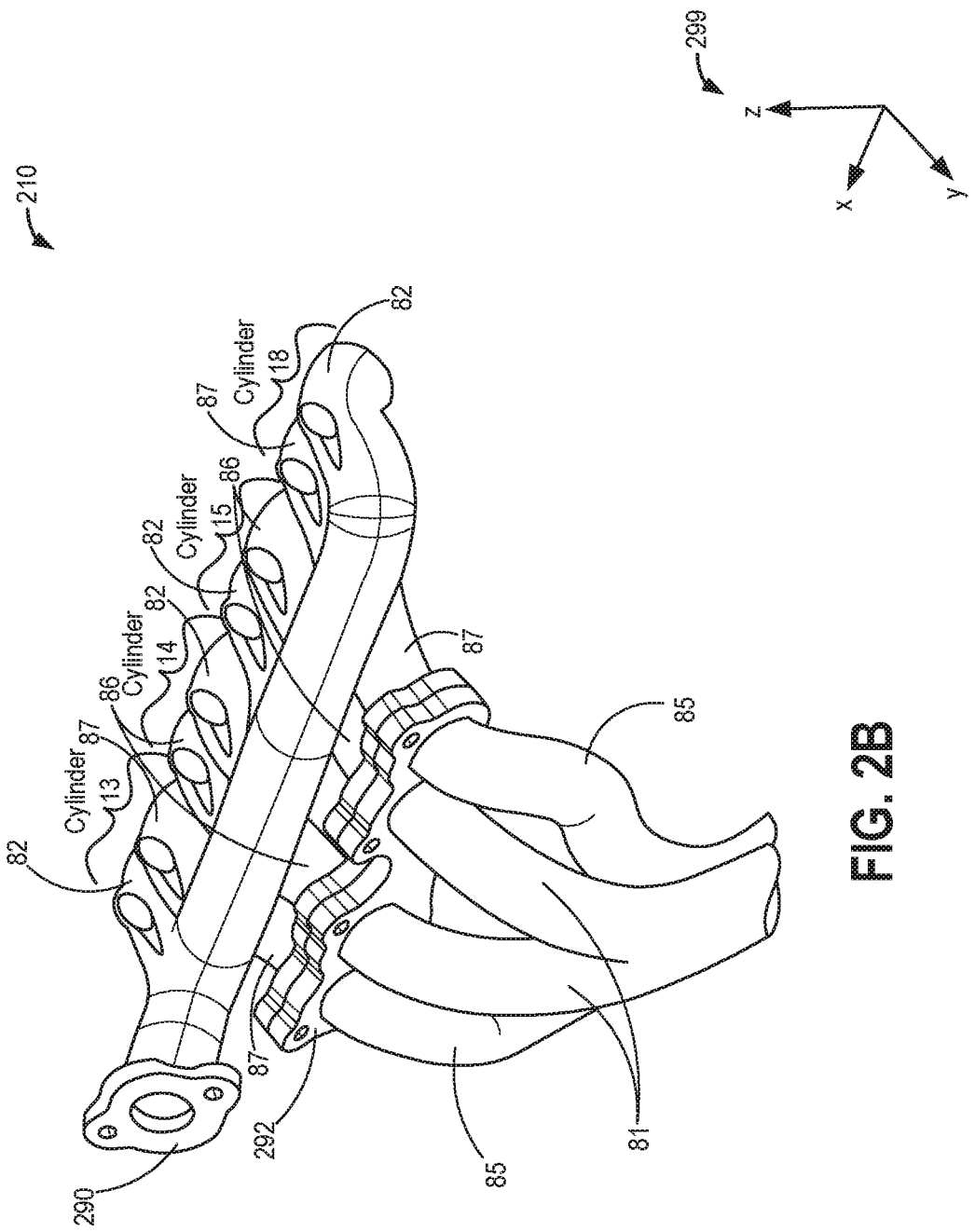
FIG. 2B shows a first detailed view of an example exhaust port arrangement of the split exhaust system of FIG. 2A.
Figure 2C:
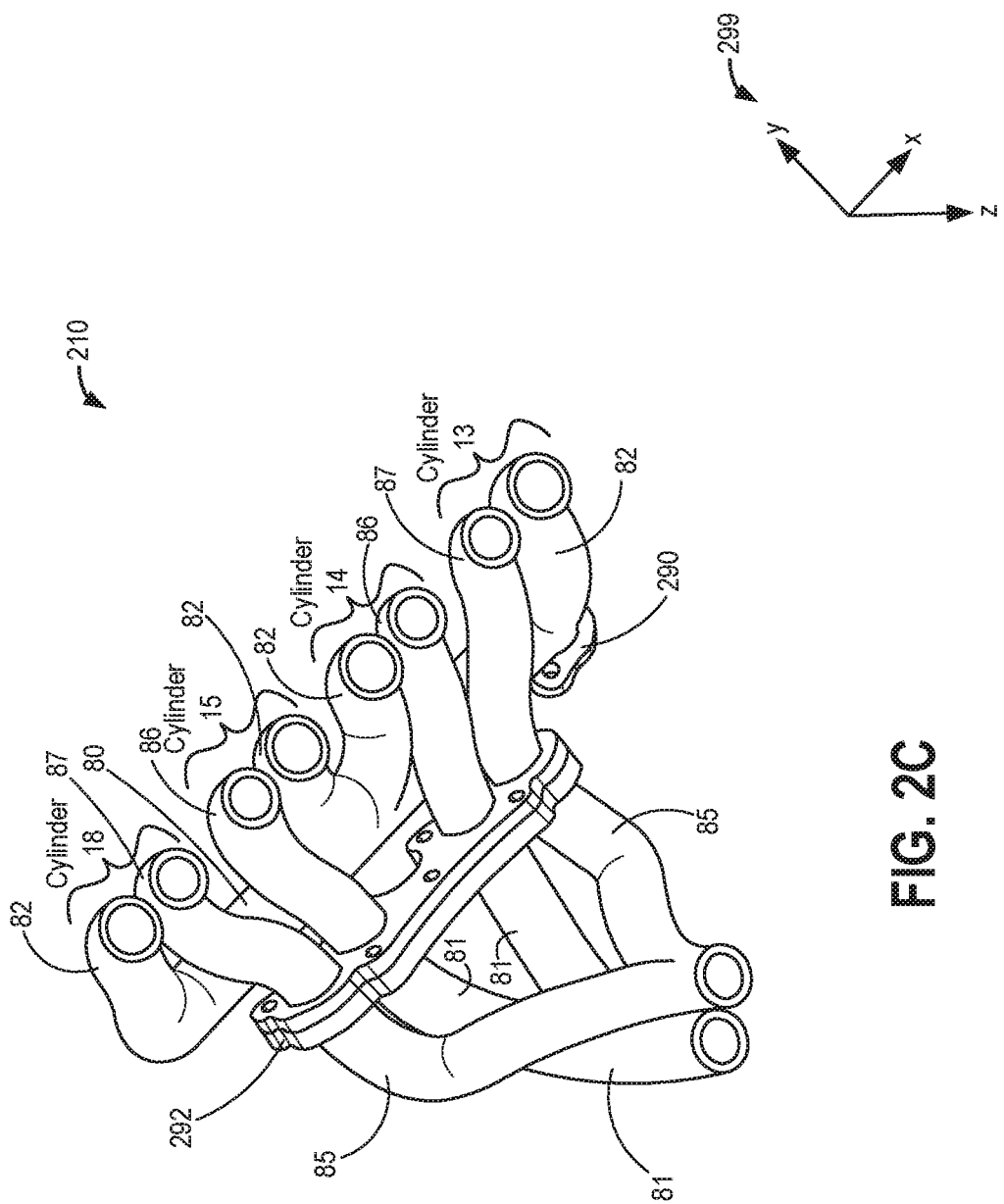
FIG. 2C shows a second detailed view of an example exhaust port arrangement of the split exhaust system of FIG. 2A.

Turning briefly to FIGS. 2B-2C, three-dimensional partial perspective views of exhaust port and manifold arrangement 210 are shown. Thus, components of FIGS. 2B and 2C that are the same as components of FIG. 2A are numbered the same and may not be reintroduced. Reference axes 299 are provided for relative spatial orientation. Similar to FIG. 2A, FIGS. 2B and 2C show second exhaust port 82 of cylinder 14 arranged adjacent to (e.g., in the x-direction of reference axes 199) second exhaust port 82 of cylinder 15, without any other exhaust port positioned therebetween. Further, first exhaust port 87 of cylinder 13 is arranged adjacent to first exhaust port 86 of cylinder 14 (e.g., in the x-direction), and first exhaust port 87 of cylinder 18 is arranged adjacent to first exhaust port 86 of cylinder 15 (e.g., in the x-direction). Additionally, as shown in FIGS. 2B and 2C, the first exhaust ports 86 and 87 may exit the cylinder head vertically below (e.g., in a more negative z-direction, as shown by reference axes 299) second exhaust ports 82. The particular shapes of the exhaust ports and the locations at which first exhaust ports 86 combine with each other and first exhaust ports 87 combine with each other may be optimized to equalize a blowdown volume for each scroll of the twin scroll turbine 165 (not shown in FIG. 2B).

In the example shown in FIGS. 2B and 2C, each of the first exhaust ports 86 and 87 exit the cylinder head (not shown) separately at a mounting flange 292. For example, first exhaust port 87 of cylinder 13 is fluidly coupled to second manifold portion 85 at a first outlet in mounting flange 292, first exhaust port 86 of cylinder 14 is fluidly coupled to first manifold portion 81 at a second outlet in mounting flange 292, which is separate from the first outlet, first exhaust port 86 of cylinder 15 is fluidly coupled to first manifold portion 81 at a third outlet in mounting flange 292, which is separate from each of the first and second outlets, and first exhaust port 87 of cylinder 18 is fluidly coupled to second manifold portion 85 via a fourth outlet in mounting flange 292, which is separate from each of the first outlet, the second outlet, and the third outlet. In other examples, first exhaust ports 86 may combine prior to coupling with mounting flange 292, and/or first exhaust ports 87 may combine prior to coupling with mounting flange 292. However, in each example, first exhaust ports 86 may flow exhaust gas only to first manifold portion 81, and first exhaust ports 87 may flow exhaust gas only to second manifold portion 85, and first exhaust ports 86 may not combine with first exhaust ports 87. Conversely, in examples where turbine 165 is a monoscroll turbine, any or all of first exhaust ports 86 and first exhaust ports 87 may combine prior to coupling with mounting flange 292. For example, second exhaust ports 82 of each cylinder combine to a single passage before coupling to a mounting flange 290, which may fluidly couple second exhaust ports 82 to scavenge manifold 80 (not shown in FIGS. 2B and 2C). First exhaust ports 86 and 87 may combine to a single passage in an analogous manner.

Returning to FIG. 2A, if the first and second exhaust ports alternated across the cylinder head of engine 10 instead of having the mirrored split exhaust system 200, the distance (and thus volume) between blowdown exhaust valves 8 and the turbine inlet 163 may be uneven. For example, if first exhaust port 87 of cylinder 13 and first exhaust port 86 of cylinder 15 were arranged to the left of the second exhaust ports 82 (in the view shown in FIG. 2A), the distance between blowdown exhaust valve 8 of cylinder 13 to turbine 165 would be greater than the distance between blowdown exhaust valve 8 of cylinder 18. Further, the distance between blowdown exhaust valve 8 of cylinder 14 to turbine 165 would be greater than the distance between blowdown exhaust valve 8 of cylinder 15 of turbine 165.

By centering the turbine inlet 163 between inside cylinders 14 and 15, a first distance between blowdown exhaust valve 8 of cylinder 14 and the turbine inlet 163 is equalized with a second distance between blowdown exhaust valve 8 of cylinder 15 and the turbine inlet 163, and a third distance between blowdown exhaust valve 8 of cylinder 13 is equalized with a fourth distance between blowdown exhaust valve 8 of cylinder 18 and the turbine inlet 163. Further still, by arranging first exhaust ports 86 adjacent to first exhaust ports 87, the distance between blowdown exhaust valves 8 of inner cylinder 14 and 15 is more similar to the distance between blowdown exhaust valves 8 of outer cylinders 13 and 18 than when first exhaust ports 86 are not adjacent to first exhaust ports 87. First manifold portion 81 and second manifold portion 85 may be shaped to compensate for differences in the distance between the blowdown exhaust valves 8 of the inner and outer cylinders such that a volume of first exhaust ports 86 and first manifold portion 81 is equivalent to a volume of first exhaust ports 87 and second manifold portion 85. With the two volumes being equivalent, a pressure developed by each blowdown pulse may be equal, and no first order noise or vibration will occur at turbine 165. As a result, vehicle occupant disturbance may be reduced, which may in turn increase vehicle occupant satisfaction.

Further, although the example shown in FIG. 2A includes the turbine inlet 163 centered at the central axis 101, in other examples, the turbine inlet 163 may not be centered at the central axis 101 since first manifold portion 81 and second manifold portion 85 may be shaped to compensate for volume differences. Further still, there may be even more variability for the positioning of turbine inlet 163 when turbine 165 is a monoscroll turbine. For example, if first exhaust ports 86 and 87 are combined in the cylinder head and exit the cylinder head to a single, combined "log" blowdown exhaust manifold 84 for connecting to the turbine, the volume would be similar no matter where the turbine is positioned on the manifold (e.g., the middle or either end of the "log"). The turbine inlet 165 may be positioned away from the central axis 101 to accommodate catalyst packaging and/or due to constraints with respect to the inlet of compressor 162.

Referring now to FIG. 3, a partial view of a single cylinder of internal combustion engine 10 is shown. As such, components previously introduced in FIG. 1A are represented with the same reference numbers and are not re-introduced. Engine 10 is depicted with combustion chamber (cylinder) 130, which may represent any of cylinders 13, 14, 15, and 18 of FIG. 1A. Combustion chamber 130 includes a coolant sleeve 114 and cylinder walls 132, with a piston 136 positioned therein and connected to a crankshaft 140. Combustion chamber 130 is shown communicating with intake manifold 44 and first exhaust port 86 via intake valve 4 and first exhaust valve 8, respectively. As previously described in FIG. 1A, each cylinder of engine 10 may exhaust combustion products along two conduits, and only the first exhaust port (e.g., runner) leading from the cylinder to the turbine is shown in FIG. 3, while the second exhaust port (e.g., second exhaust port 82) is not visible in this view. Alternatively, the first exhaust port may be first exhaust port 87 shown in FIGS. 1A-2B.

As also previously elaborated in FIG. 1A, each cylinder of engine 10 may include two intake valves and two exhaust valves. In the depicted view, only one intake valve (e.g., intake valve 4) and first exhaust valve 8 are shown. Intake valve 4 and first exhaust valve 8 are located at an upper region of combustion chamber 130. Intake valve 4 and first exhaust valve 8 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, each intake valve, including intake valve 4, is controlled by an intake cam 151, and each exhaust valve, including first exhaust valve 8, is controlled by an exhaust cam 153. The intake cam 151 may be actuated via an intake valve timing actuator 105 and the exhaust cam 153 may be actuated via an exhaust valve timing actuator 103 according to set intake and exhaust valve timings, respectively. In some examples, the intake valves and exhaust valves may be deactivated via the intake valve timing actuator 105 and exhaust valve timing actuator 103, respectively. For example, the controller may send a signal to the exhaust valve timing actuator 103 to deactivate the first exhaust valve 8 such that it remains closed and does not open at its set timing. The position of intake camshaft 151 and exhaust camshaft 153 may be determined by camshaft position sensors 155 and 157, respectively. As introduced above, in one example, all exhaust valves of every cylinder may be controlled on a same exhaust camshaft. As such, a timing of both of the scavenge (second) exhaust valve and the blowdown (first) exhaust valve may be adjusted together via one camshaft, but they may each have different timings relative to one another. In another example, the blowdown exhaust valve of every cylinder may be controlled via a first exhaust camshaft, and a scavenge exhaust valve of every cylinder may be controlled on via different, second exhaust camshaft. In this way, the valve timing of the scavenge valves and blowdown valves may be adjusted separately from one another. In alternative examples, the cam or valve timing system(s) of the scavenge and/or blowdown exhaust valves may employ a cam in cam system, an electrohydraulic-type system on the scavenge valves, and/or an electro-mechanical valve lift control on the scavenge valves.

In some examples, the intake and/or exhaust valves may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at lower cylinder pressures from exhaust gases exhausted at higher cylinder pressures. For example, a first exhaust cam profile can open the first exhaust valve (e.g., blowdown valve) from a closed position just before bottom dead center (BDC) of the power stroke of combustion chamber 130 and close the same exhaust valve well before top dead center (TDC) of the exhaust stroke to selectively exhaust blowdown gases from the combustion chamber. Further, a second exhaust cam profile can be used to open the second exhaust valve (e.g., scavenge valve) from a closed position before a mid-point of the exhaust stroke and close it after TDC to selectively exhaust the scavenging portion of the exhaust gases. Example valve timings will be described below with respect to FIG. 4.

Thus, the timing of the first exhaust valve and the second exhaust valve can isolate cylinder blowdown gases from a scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine (e.g., turbine 165 introduced in FIG. 1A) and a higher pressure exhaust passage and flowing a later, second portion of the exhaust gas (e.g., lower pressure exhaust) and blowthrough air to the compressor inlet (e.g., an inlet of compressor 162 introduced in FIG. 1A), the engine system efficiency may be increased.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include spark plug 92 for initiating combustion. Ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse width of a signal FPW received from controller 12 via an electronic driver 168. In this manner, fuel injector 66 provides what is known as direct injection (hereafter also referred to as "DI") of fuel into cylinder 130. While FIG. 3 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 3 as a microcomputer, including a microprocessor unit 102, input/output ports 104, an electronic storage medium for executable programs and calibration values shown as a read only memory 106 in this particular example, random access memory 108, keep alive memory 111, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including a measurement of inducted mass air flow (MAF) from mass air flow sensor 48; an engine coolant temperature signal (ECT) from a temperature sensor 112 coupled to coolant sleeve 114; a profile ignition pickup signal (PIP) from a Hall effect sensor 120 (or other type) coupled to crankshaft 140; a throttle position (TP) from a throttle position sensor coupled to throttle 62; and an absolute manifold pressure signal (MAP) from MAP sensor 122. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 5.

In some examples, the vehicle may be a hybrid vehicle with multiple sources of torque available to one or more vehicle wheels 160. In other examples, the vehicle is a conventional vehicle with only an engine. In the example shown in FIG. 3, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Now turning to FIG. 4, graph 400 depicts example valve timings with respect to a piston position for an engine cylinder comprising four valves: two intake valves and two exhaust valves, such as described above with reference to FIGS. 1A-3. The cylinder is configured to receive intake air via two intake valves (e.g., intake valves 2 and 4 introduced in FIG. 1A), exhaust a first, blowdown portion of exhaust gas to a turbine inlet via a first exhaust valve (e.g., first, or blowdown, exhaust valve 8 introduced in FIG. 1A), exhaust a second, scavenging portion of exhaust gas to an intake passage via a second exhaust valve (e.g., second, or scavenge, exhaust valve 6 introduced in FIG. 1A), and provide non-combusted blowthrough air to the intake passage via the second exhaust valve. By adjusting the timing of the opening and/or closing of the second exhaust valve with that of the two intake valves, residual exhaust gases in the cylinder clearance volume may be flushed out and recirculated as EGR along with fresh intake blowthrough air.

Graph 400 illustrates an engine position along the horizontal axis in crank angle degrees (CAD). In the example of FIG. 4, relative differences in timings can be estimated by the drawing dimensions. However, other relative timings may be used, if desired. Plot 402 depicts piston position (along the vertical axis) relative to top dead center (TDC), bottom dead center (BDC), and the four strokes of an engine cycle (intake, compression, power, and exhaust). During the intake stroke, generally, the exhaust valves close and intake valves open. Air is introduced into the cylinder via the intake manifold and the corresponding intake ports, and the piston moves to the bottom of the cylinder so as to increase the volume within the cylinder. The position at which the piston is at its bottom-most position in the cylinder and at the end of its stroke (e.g., when the combustion chamber is at its largest volume) is typically referred to as BDC. During the compression stroke, the intake valves and the exhaust valves are closed. The piston moves toward the cylinder head so as to compress the air within the cylinder. The point at which the piston is at the end of its stroke and closest to the cylinder head (e.g., when the combustion chamber is at its smallest volume) is typically referred to as TDC. In a process herein referred to as injection, fuel is introduced into the combustion chamber. In a process herein referred to as ignition, the injected fuel is ignited, such as via a spark from a spark plug, resulting in combustion. During the expansion stroke, the expanding gases push the piston back down to BDC. A crankshaft (e.g., crankshaft 140 shown in FIG. 3) converts this piston movement into a rotational torque of the rotary shaft. During the exhaust stroke, the exhaust valves are opened to release the combusted air-fuel mixture to the corresponding exhaust passages, and the piston returns to TDC. In this description, the second exhaust (scavenge) valves may be opened after the beginning of the exhaust stroke and may stay open until after the end of the exhaust stroke, while the first exhaust (blowdown) valves are closed and the intake valves are opened to flush out residual exhaust gases with blowthrough air.

Plot 404 depicts an intake valve timing, lift, and duration for a first intake valve (Int_1), while plot 406 depicts an intake valve timing, lift, and duration for a second intake valve (Int_2), both intake valves coupled to the intake passage of the engine cylinder. Plot 408 depicts an example exhaust valve timing, lift, and duration for a first exhaust valve (Exh_1), which may correspond to first (e.g., blowdown) exhaust valve 8 introduced in FIG. 1A, coupled to a first exhaust manifold (e.g., blowdown exhaust manifold 84 shown in FIGS. 1A and 2A) of via a first exhaust port (e.g., first exhaust port 86 or 87 of FIGS. 1A and 2A). Plot 410 depicts an example exhaust valve timing, lift, and duration for a second exhaust valve (Exh_2), which may correspond to second (e.g., scavenge) exhaust valve 6 shown in FIGS. 1A and 2A, coupled to a scavenge manifold (e.g., scavenge manifold 80 shown in FIGS. 1A and 2A) via a second exhaust port (e.g., second exhaust port 82 of FIGS. 1A and 2A). As previously elaborated, the first exhaust manifold connects the first exhaust valve to the inlet of a turbocharger turbine (e.g., turbine 165 of FIGS. 1A and 2A), and the scavenge manifold connects the second exhaust valve to an intake passage via an EGR passage (e.g., first EGR passage 50 shown in FIGS. 1A and 2A). The first exhaust manifold may be separate from the scavenge manifold, as explained above.

In the depicted example, the first and second intake valves are fully opened from a closed position (e.g., a valve lift of zero) at a common timing (plots 404 and 406), beginning near the intake stroke TDC just after CAD2 (e.g., at or just after the intake stroke TDC), and are closed after a subsequent compression stroke has commenced past CAD3 (e.g., after BDC). Additionally, when opened fully, the two intake valves may be opened with a same amount of valve lift L1 for a same duration of D1. In other examples, the two intake valves may be operated with a different timing by adjusting the phasing, lift, or duration. In contrast to the common timing of the first and second intake valves, the timing of the first exhaust valve opening and closing may be staggered relative to the second exhaust valve opening and closing. Specifically, the first exhaust valve (plot 408) is opened from a closed position at a first timing that is earlier in the engine cycle than the timing at which the second exhaust valve (plot 410) is opened from a closed position. Specifically, the first timing for opening the first exhaust valve is between TDC and BDC of the power stroke, before CAD1 (e.g., before the exhaust stroke BDC), while the timing for opening the second exhaust valve is just after the exhaust stroke BDC, after CAD1 but before CAD2. The first exhaust valve (plot 408) is closed before the end of the exhaust stroke, and the second exhaust valve (plot 410) is closed after the end of the exhaust stroke. Thus, the second exhaust valve remains open to overlap slightly with opening of the intake valves.

To elaborate, the first exhaust valve (plot 408) may be fully opened from close before the start of an exhaust stroke (e.g., between 90 and 40 degrees before BDC), maintained fully open through a first part of the exhaust stroke, and may be fully closed before the exhaust stroke ends (e.g., between 50 and 0 degrees before TDC) to collect the blowdown portion of the exhaust pulse. The second exhaust valve (plot 410) may be fully opened from a closed position just after the beginning of the exhaust stroke (e.g., between 40 and 90 degrees past BDC), maintained open through a second portion of the exhaust stroke, and may be fully closed after the intake stroke begins (e.g., between 20 and 70 degrees after TDC) to exhaust the scavenging portion of the exhaust. Additionally, the second exhaust valve and the intake valves, as shown in FIG. 4, may have a positive overlap phase (e.g., from between 20 degrees before TDC and 40 degrees after TDC until between 40 and 90 degrees past TDC) to allow blowthrough with EGR. This cycle, wherein all four valves are operational, may repeat itself based on engine operating conditions.

Additionally, the first exhaust valve (plot 408) may be opened with a first amount of valve lift L2, while the second exhaust valve (plot 410) may be opened with a second amount of valve lift L3, where L3 is smaller than L2. Further still, the first exhaust valve may be opened at the first timing for a duration D2, while the second exhaust valve may be opened for a duration D3, where D3 is smaller than D2. It will be appreciated that in other examples, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in the cylinder) from residual exhaust gases at low pressure (e.g., exhaust gases that remain in the cylinder after blowdown) into the different manifolds. By conveying the blowdown exhaust gases to the turbine via the first exhaust ports when the first exhaust ports are arranged in the mirrored configuration shown in FIGS. 1A-1C, energy recovery at the turbine may be increased. By conveying the blowdown exhaust gases to the turbine via the first exhaust ports when the first exhaust ports are arranged in the mirrored configuration shown in FIGS. 2A-2C, first order noise and vibration may be reduced. Further, by conveying low pressure residual exhaust gases as EGR along with blowthrough air to the compressor inlet (via the first EGR passage and the scavenge manifold), combustion chamber temperatures can be lowered, thereby reducing an occurrence of knock and an amount of spark retard from maximum brake torque timing. Further, because the exhaust gases at the end of the exhaust stroke are directed to either downstream of the turbine or upstream of the compressor, which are both at lower pressures, exhaust pumping losses can be minimized to increase engine efficiency.

Thus, exhaust gases can be used more efficiently than simply directing all the exhaust gas of a cylinder through a single, common exhaust port to the turbocharger turbine. As such, several advantages may be achieved. For example, the average exhaust gas pressure supplied to the turbocharger can be increased by separating and directing the blowdown pulse into the turbine inlet to increase turbocharger output. Additionally, fuel economy may be increased because blowthrough air is not routed to the catalyst, being directed to the compressor inlet instead, and therefore, excess fuel may not be injected into the exhaust gases to maintain a stoichiometric air-fuel ratio upstream of the catalyst.

FIG. 5 shows an example method 500 for operating an engine system having a split exhaust system with a mirrored exhaust port configuration, such as split exhaust system 100 shown in FIG. 1A or split exhaust system 200 of FIG. 2A. Instructions for carrying out method 500 and the rest of the methods included herein may be executed by a controller (e.g., controller 12 of FIGS. 1A, 2A, and 3) based on instructions stored on a memory of the controller and in conjunction with signals received from sensors of the engine system, such as the sensors described above with reference to FIGS. 1A and 3. The controller may employ engine actuators of the engine system (e.g., fuel injector 66, spark plug 92, intake valves 2 and 4, blowdown exhaust valve 8, and scavenge exhaust valve 6 shown in FIGS. 1A and 2A) to adjust engine operation according to the methods described below.

At 502, method 500 includes combusting an air-fuel mixture in cylinders of the engine system. For example, intake air (and in some examples, recirculated exhaust gas) may be inducted through an intake passage (e.g., intake passage 28 of FIGS. 1A and 2A) to an intake manifold of the engine (e.g., intake manifold 44 of FIGS. 1A and 2A). Each of the engine cylinders may receive the intake air via one or more intake ports upon opening of a corresponding one or more intake valves (e.g., intake valves 2 and 4 of FIGS. 1A and 2A). The controller may operate the intake valves using the example valve profile (e.g., valve timing, lift, and duration) shown in FIG. 4, for example. The controller may inject a determined amount of fuel into each cylinder (e.g., for achieving a desired air-fuel ratio) at a determined timing via the fuel injectors, the fuel mixing with the intake air to produce the air-fuel mixture, and then ignite the air-fuel mixture (e.g., via the spark plugs) to combust the air-fuel mixture and produce exhaust gas.

At 504, method 500 includes flowing blowdown exhaust gas from the engine cylinders to a turbocharger turbine (e.g., turbine 165 of turbocharger 164 shown in FIGS. 1A and 2A) via first (blowdown) exhaust valves, first exhaust ports, and a blowdown manifold. For example, the controller may open the first exhaust valve of each cylinder (e.g., first exhaust valve 8 of FIGS. 1A and 2A) using the example valve profile shown in FIG. 4 to direct the blowdown exhaust gas, which is a higher pressure portion of the exhaust gas produced by combusting the air-fuel mixture, out of the corresponding cylinder and to the blowdown manifold (e.g., blowdown manifold 84) via the corresponding first exhaust port (e.g., first exhaust port 86 or 87 shown in FIGS. 1A-2C). The blowdown manifold may transport the blowdown exhaust gas to an inlet of the turbocharger turbine. In particular, when the turbine is a twin scroll turbine, the blowdown manifold may include two manifold portions (e.g., first manifold portion 81 and second manifold portion 85 shown in FIGS. 1A and 2A) so that the blowdown exhaust gas from a first group of the engine cylinders is exclusively directed to a first scroll of the twin scroll turbine and the blowdown exhaust gas from a second group of the engine cylinders is exclusively directed to a second scroll of the twin scroll turbine. As one example, as described above with respect to FIGS. 1A-1C, the first exhaust ports may be arranged across a cylinder head that caps the engine cylinders in a first configuration that minimizes a volume to the inlet of the turbocharger turbine, thereby maximizing a pressure of the blowdown exhaust gas delivered to the turbine to increase energy recovery at the turbine and increase an amount of power available to drive a compressor of the turbocharger for a same amount of blowdown exhaust gas flow. As another example, as described above with respect to FIGS. 2A-2C, the first exhaust ports may be arranged across the cylinder head in a second configuration, different from the first configuration, that equalizes a volume to the inlet of the turbocharger turbine from each cylinder, thereby reducing pressure differences from each blowdown pulse and reducing first order noise and vibration at the turbine.

At 506, method 500 includes flowing scavenge exhaust gas and/or blowthrough air from the engine cylinders to a scavenge manifold via second (scavenge) exhaust valves and second exhaust ports. For example, the controller may open the second exhaust valve of each cylinder (e.g., second exhaust valve 6 of FIGS. 1A and 2A) using the example valve profile shown in FIG. 4 to direct the scavenge exhaust gas, which is a lower pressure portion of the exhaust gas produced by combusting the air-fuel mixture, out of the corresponding cylinder and to the scavenge manifold (e.g., scavenge manifold 80) via the corresponding second exhaust port (e.g., second exhaust port 82 shown in FIGS. 1A-2C). Further, in some examples, an open duration of the one or more intake valves may overlap with an open duration of the second exhaust valve so that blowthrough air flows through the cylinder and to the scavenge manifold. Further still, the scavenge manifold may flow the scavenge exhaust gas and/or the blowthrough air to the intake passage via one or more EGR passages, such as by the controller at least partially opening one or more EGR valves. Method 500 may then end.

In this way, by including first and second exhaust ports in a non-alternating, symmetrical arrangement, turbocharger turbine performance may be enhanced. As one example, the first and second exhaust ports may be arranged to reduce a distance between each first exhaust port and the turbine. As a result, a volume of blowdown exhaust gas provided to the turbine from each cylinder may be decreased, thereby increasing the pressure of the blowdown exhaust gas to increase an efficiency of energy recover at the turbine. As another example, the first and second exhaust ports may be arranged to reduce a difference in the volume of the blowdown exhaust gas provided to the turbine from each cylinder. As a result, a consistent volume, and pressure, of the blowdown exhaust gas may be received by the turbine from each cylinder, thereby increasing turbine balance and decreasing first order noise and vibration at the turbine.

The technical effect of flowing blowdown exhaust gas to a turbocharger turbine via first exhaust ports of a split exhaust system, the first exhaust ports arranged relative to second exhaust ports in a non-alternating, mirrored pattern, is that performance characteristics of the turbocharger turbine may be increased.

FIGS. 1B-1C and 2B-2C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As one example, a system comprises: an engine having a plurality of cylinders arranged along a cylinder head, each including first and second exhaust ports, the first and second exhaust ports arranged in a non-alternating pattern across the cylinder head; a blowdown exhaust manifold coupled to the first exhaust port of each cylinder and an exhaust passage; and a scavenge exhaust manifold coupled to the second exhaust port of each cylinder and an intake passage. In the preceding example, the system additionally or optionally further comprises a turbine coupled in the exhaust passage and configured to receive exhaust gas flow from the blowdown exhaust manifold. In one or both of the preceding examples, additionally or optionally, an inlet to the turbine is centered along a central axis of the cylinder head. In any or all of the preceding examples, additionally or optionally, the plurality of cylinders includes two inner-most cylinders and two outer-most cylinders relative to a central axis of the cylinder head, the plurality of cylinders arranged in an in-line configuration, and the non-alternating pattern includes a plane of symmetry arranged at the central axis. In any or all of the preceding examples, additionally or optionally, the first exhaust port of each of the plurality of cylinders is arranged closer to the central axis than the second exhaust port of the corresponding cylinder. In any or all of the preceding examples, additionally or optionally, the first exhaust port of each of the two outer-most cylinders is arranged adjacent to the first exhaust port of one of the two inner-most cylinders. In any or all of the preceding examples, additionally or optionally, the turbine is a twin scroll turbine, and the first exhaust ports of the two innermost cylinders are fluidly coupled to a first portion of the blowdown exhaust manifold, the first portion configured to flow exhaust gas to a first scroll of the twin scroll turbine, and the first exhaust ports of the two outer-most cylinders are fluidly coupled to a second portion of the blowdown exhaust manifold, the second portion configured to flow exhaust gas to a second scroll of the twin scroll turbine. In any or all of the preceding examples, additionally or optionally, the first exhaust ports of the outer-most cylinders combine within the cylinder head. In any or all of the preceding examples, additionally or optionally, the first exhaust ports of each cylinder remain separate within the cylinder head.

As another example, a method comprises: combusting a mixture of air and fuel in a plurality of engine cylinders, including two inner cylinders and two outer cylinders, each engine cylinder including a first exhaust port and a second exhaust port arranged in a cylinder head; flowing a first portion of exhaust gas generated via the combusting through the first exhaust port of each engine cylinder and to a first exhaust manifold, the first exhaust port of each inner cylinder arranged closer to a centerline of the cylinder head than the second exhaust port of each inner cylinder; and flowing a second portion of the exhaust gas through the second exhaust port of each engine cylinder and to a second exhaust manifold. In the preceding example, additionally or optionally, the first exhaust port of each outer cylinder is arranged closer to the centerline of the cylinder head than the second exhaust port of each outer cylinder, the first exhaust manifold is fluidly coupled to a turbocharger turbine, and the second exhaust manifold is fluidly coupled to an exhaust gas recirculation passage. In one or both of the preceding examples, additionally or optionally, the first portion of the exhaust gas is a higher pressure blowdown portion of the exhaust gas, and flowing the first portion of the exhaust gas through the first exhaust port of each engine cylinder to the first exhaust manifold includes flowing the higher pressure blowdown portion of the exhaust gas through the first exhaust port of each engine cylinder to the turbocharger turbine via the first exhaust manifold. In any or all of the preceding examples, additionally or optionally, flowing the higher pressure blowdown portion of the exhaust gas through the first exhaust port of each engine cylinder to the turbocharger turbine via the first exhaust manifold includes flowing the higher pressure blowdown portion of the exhaust gas via a shortest flow path between each engine cylinder and an inlet to the turbocharger turbine. In any or all of the preceding examples, additionally or optionally, the second exhaust port of each outer cylinder is arranged closer to the centerline of the cylinder head than the first exhaust port of each outer cylinder, the second exhaust manifold is fluidly coupled to a turbocharger turbine, and the first exhaust manifold is fluidly coupled to an exhaust gas recirculation passage. In any or all of the preceding examples, additionally or optionally, the second portion of the exhaust gas is a higher pressure blowdown portion of the exhaust gas, and flowing the second portion of the exhaust gas through the second exhaust port of each engine cylinder to the second exhaust manifold includes flowing the higher pressure blowdown portion of the exhaust gas through the second exhaust port of each cylinder to the turbocharger turbine via the second exhaust manifold. In any or all of the preceding examples, additionally or optionally, flowing the higher pressure blowdown portion of the exhaust gas through the second exhaust port of each cylinder to the turbocharger turbine via the second exhaust manifold includes flowing a same volume of the higher pressure blowdown portion of the exhaust gas from the second exhaust port of each engine cylinder to the turbocharger turbine.

As another example, a system comprises: an engine including a plurality of cylinders, each of the plurality of cylinders including first and second exhaust ports, the first and second exhaust ports having a symmetrical arrangement across a central axis of the cylinder head; a first exhaust manifold coupled to the first exhaust port of each cylinder and an exhaust passage of the engine; a second exhaust manifold coupled to the second exhaust port of each cylinder and an exhaust gas recirculation passage, the exhaust gas recirculation passage coupled to an intake passage of the engine; and a turbocharger turbine arranged in the exhaust passage, configured to receive combusted exhaust gas from the engine via the first exhaust ports and the first exhaust manifold. In the preceding example, additionally or optionally, the symmetrical arrangement includes the first exhaust ports of each cylinders arranged closer to the central axis relative to the second exhaust ports of each cylinder, and wherein the intake passage includes a turbocharger compressor arranged downstream of where the exhaust gas recirculation passage couples to the intake passage. In one or both of the preceding examples, additionally or optionally, the plurality of cylinders includes two inner cylinders and two outer cylinders, the central axis positioned between the two inner cylinders, and the symmetrical arrangement includes the first exhaust ports of the two inner cylinders arranged further from the central axis relative to second exhaust ports of the two inner cylinders. In any or all of the preceding examples, additionally or optionally, the symmetrical arrangement further includes the first exhaust ports of the two outer cylinders arranged closer to the central axis relative to the second exhaust ports of the two outer cylinders.

In another representation, a method comprises: combusting a mixture of air and fuel in a plurality of engine cylinders, each engine cylinder including a first exhaust port and a second exhaust port arranged in a mirrored pattern in a cylinder head, the mirrored pattern reflected across a central axis of the cylinder head; flowing a first portion of exhaust gas generated via the combusting through the first exhaust port of each engine cylinder and to a first exhaust manifold coupled to a turbocharger turbine; and flowing a second portion of the exhaust gas through the second exhaust port of each engine cylinder and to a second exhaust manifold coupled to a turbocharger compressor inlet. In the preceding example, additionally or optionally, the mirrored pattern includes the first exhaust port of each cylinder positioned closer to the central axis than the second exhaust port. In one or both of the preceding examples, additionally or optionally, the plurality of engine cylinders includes two inner-most cylinders and two outer-most cylinders, and the mirrored pattern includes the first exhaust port of each outer cylinder positioned closer to the central axis than the second exhaust port of each outer cylinder and the first exhaust port of each inner cylinder positioned further from the central axis than the second exhaust port of each inner cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine having a plurality of cylinders arranged along a cylinder head, each including first and second exhaust ports, the first and second exhaust ports arranged in a non-alternating pattern across the cylinder head;
a blowdown exhaust manifold coupled to the first exhaust port of each cylinder and an exhaust passage;
a scavenge exhaust manifold coupled to the second exhaust port of each cylinder and an intake passage; and
a turbine coupled in the exhaust passage and configured to receive exhaust gas flow from the blowdown exhaust manifold,
wherein the plurality of cylinders includes two inner-most cylinders and two outer-most cylinders relative to a central axis of the cylinder head, the plurality of cylinders arranged in an in-line configuration, and the non-alternating pattern includes a plane of symmetry arranged at the central axis.

2. The system of claim 1, wherein an inlet to the turbine is centered along a central axis of the cylinder head.

3. The system of claim 1, wherein the first exhaust port of each of the plurality of cylinders is arranged closer to the central axis than the second exhaust port of the corresponding cylinder.

4. The system of claim 1, wherein the first exhaust port of each of the two outer-most cylinders is arranged adjacent to the first exhaust port of one of the two inner-most cylinders.

5. The system of claim 1, wherein the turbine is a twin scroll turbine, and the first exhaust ports of the two inner-most cylinders are fluidly coupled to a first portion of the blowdown exhaust manifold, the first portion configured to flow exhaust gas to a first scroll of the twin scroll turbine, and the first exhaust ports of the two outer-most cylinders are fluidly coupled to a second portion of the blowdown exhaust manifold, the second portion configured to flow exhaust gas to a second scroll of the twin scroll turbine.

6. The system of claim 1, wherein the first exhaust ports of the outer-most cylinders combine within the cylinder head.

7. The system of claim 1, wherein the first exhaust ports of each cylinder remain separate within the cylinder head.

8. A method, comprising:
combusting a mixture of air and fuel in a plurality of engine cylinders, including two inner cylinders and two outer cylinders, each engine cylinder including a first exhaust port and a second exhaust port arranged in a cylinder head;
flowing a first portion of exhaust gas generated via the combusting through the first exhaust port of each engine cylinder and to a first exhaust manifold, the first exhaust port of each inner cylinder arranged closer to a centerline of the cylinder head than the second exhaust port of each inner cylinder; and flowing a second portion of the exhaust gas through the second exhaust port of each engine cylinder and to a second exhaust manifold, wherein the first exhaust port of each outer cylinder is arranged closer to the centerline of the cylinder head than the second exhaust port of each outer cylinder, the first exhaust manifold is fluidly coupled to a turbocharger turbine, and the second exhaust manifold is fluidly coupled to an exhaust gas recirculation passage.

9. The method of claim 8, wherein the first portion of the exhaust gas is a higher pressure blowdown portion of the exhaust gas, and flowing the first portion of the exhaust gas through the first exhaust port of each engine cylinder to the first exhaust manifold includes flowing the higher pressure blowdown portion of the exhaust gas through the first exhaust port of each engine cylinder to the turbocharger turbine via the first exhaust manifold.

10. The method of claim 9, wherein flowing the higher pressure blowdown portion of the exhaust gas through the first exhaust port of each engine cylinder to the turbocharger turbine via the first exhaust manifold includes flowing the higher pressure blowdown portion of the exhaust gas via a shortest flow path between each engine cylinder and an inlet to the turbocharger turbine.

11. A system, comprising:
an engine including a plurality of cylinders, each of the plurality of cylinders including first and second exhaust ports, the first and second exhaust ports having a symmetrical arrangement across a central axis of the cylinder head;
a first exhaust manifold coupled to the first exhaust port of each cylinder and an exhaust passage of the engine;
a second exhaust manifold coupled to the second exhaust port of each cylinder and an exhaust gas recirculation passage, the exhaust gas recirculation passage coupled to an intake passage of the engine; and
a turbocharger turbine arranged in the exhaust passage, configured to receive combusted exhaust gas from the engine via the first exhaust ports and the first exhaust manifold, wherein the plurality of cylinders includes two inner cylinders and two outer cylinders, the central axis positioned between the two inner cylinders, and the symmetrical arrangement includes the first exhaust ports of the two inner cylinders arranged further from the central axis relative to second exhaust ports of the two inner cylinders.

12. The system of claim 11, wherein the intake passage includes a turbocharger compressor arranged downstream of where the exhaust gas recirculation passage couples to the intake passage.

13. The system of claim 11, wherein the symmetrical arrangement further includes the first exhaust ports of the two outer cylinders arranged closer to the central axis relative to the second exhaust ports of the two outer cylinders.

* * * * *